(12) United States Patent
Kong et al.

(10) Patent No.: US 8,798,217 B2
(45) Date of Patent: Aug. 5, 2014

(54) METHOD AND DIGITAL CIRCUIT FOR RECOVERING A CLOCK AND DATA FROM AN INPUT SIGNAL USING A DIGITAL FREQUENCY DETECTION

(75) Inventors: Xiaohua Kong, San Diego, CA (US); Zhi Zhu, San Diego, CA (US); Nam V. Dang, San Diego, CA (US); Tirdad Sowlati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 12/938,405

(22) Filed: Nov. 3, 2010

(65) Prior Publication Data

US 2012/0109356 A1 May 3, 2012

(51) Int. Cl.
*H04L 7/00* (2006.01)
(52) U.S. Cl.
USPC ........ 375/354; 700/121; 324/76.82; 327/156; 327/49
(58) Field of Classification Search
USPC ........ 375/354; 700/121; 324/76.82; 327/156, 327/49
See application file for complete search history.

(56) References Cited

U.S. PATENT DOCUMENTS

| | | | |
|---|---|---|---|
| 4,821,297 A * | 4/1989 | Bergmann et al. ............ | 375/376 |
| 5,297,181 A | 3/1994 | Barr et al. | |
| 5,341,404 A * | 8/1994 | Sevenhans et al. ........... | 375/355 |
| 5,862,157 A | 1/1999 | Bessios | |
| 6,952,405 B2 | 10/2005 | Tsang et al. | |
| 7,183,864 B1 * | 2/2007 | Gutnik ............................ | 331/57 |
| 7,409,031 B1 * | 8/2008 | Lee et al. ....................... | 375/376 |
| 7,430,252 B2 | 9/2008 | Waltho | |
| 7,555,085 B1 | 6/2009 | Risk et al. | |
| 2002/0089356 A1 * | 7/2002 | Perrott et al. ................. | 327/105 |
| 2004/0052528 A1 | 3/2004 | Halgren et al. | |
| 2005/0025260 A1 * | 2/2005 | Hecht et al. ................... | 375/340 |
| 2005/0286643 A1 | 12/2005 | Ozawa et al. | |
| 2006/0291551 A1 * | 12/2006 | Goth ............................. | 375/232 |
| 2008/0225933 A1 * | 9/2008 | Chan et al. .................... | 375/225 |
| 2009/0147901 A1 * | 6/2009 | Do et al. ........................ | 375/375 |
| 2010/0091925 A1 * | 4/2010 | Nedovic et al. ............... | 375/359 |
| 2010/0215118 A1 * | 8/2010 | Ware et al. .................... | 375/295 |

FOREIGN PATENT DOCUMENTS

| | | |
|---|---|---|
| EP | 0317159 A2 | 5/1989 |
| EP | 0502260 A1 | 9/1992 |
| JP | H01161936 A | 6/1989 |

OTHER PUBLICATIONS

International Search Report and Written Opinion—PCT/US2011/059207—ISA/EPO—Feb. 10, 2012 (100490WO).

(Continued)

*Primary Examiner* — Shuwang Liu
*Assistant Examiner* — Nader Bolourchi
(74) *Attorney, Agent, or Firm* — Sam Talpalaysky; Nicholas J. Pauley; Joseph Agusta

(57) ABSTRACT

In a particular embodiment, a digital circuit includes a frequency detection circuit operative to compare information related to transitions between sequential samples of a received signal. The frequency detection circuit is further operative to generate a control signal to reduce a sampling rate of the received signal in response to a predetermined number of the sequential samples having a same value. The digital circuit also includes a digital phase detector operative to provide the information related to the transitions between sequential samples to the frequency detection circuit.

47 Claims, 10 Drawing Sheets

(56) References Cited

OTHER PUBLICATIONS

Rodoni L et al., "A 5.75 to 44 Gb/s Quarter Rate CDR With Data Rate Selection in 90 nm Bulk CMOS", IEEE Journal of Solid-State Circuits, Jul. 1, 2009, pp. 1927-1941, vol. 44, no. 7, IEEE Service Center, XP011263257, ISSN: 0018-9200, DOI: 10.1109/JSSC.2009.2021913.

Ramezani M., et al., "A 10 Gb/s CDR with a Half-rate Bang-Bang Phase Detector", Proceedings of the 2003 International Symposium on Circuits and Systems, vol. 2 (pp. II-181-II-184).

Ramezani M., et al., "Jitter Analysis of a PLL-based CDR with a Bang-Bang Phase Detector", The 2002 45th Midwest Symposium on Circuits and Systems, vol. 3 (pp. III-393-III-396).

\* cited by examiner

METHOD AND DIGITAL CIRCUIT FOR RECOVERING A CLOCK AND DATA FROM AN INPUT SIGNAL USING A DIGITAL FREQUENCY DETECTION

I. FIELD

The present disclosure is generally related to a method and digital circuit for recovering a clock and data from an input signal using low overhead digital frequency detection.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Portable computing devices may include a frequency detection circuit configured to receive an input signal at an input node. The frequency detection circuit may be used to assist in locking on to a frequency of the input signal for clock and data recovery. The frequency detection circuit may also be configured to receive a clock signal in parallel with a sampler at a clock node, where the clock signal represents a clock output of a clock and data recovery circuit. However, the addition of the frequency detection circuit to the input node and the clock node may degrade the performance of the clock and data recovery circuit. For example, the addition of the frequency detection circuit at the input and clock nodes increases the loading at those nodes resulting in more overhead and slower circuit response times. Further, the increased loading at the nodes changes the behavior at the nodes, changes the dynamics of a clock and data recovery circuit, changes the sampling points of the input signal, and adds to the complexity of the circuit design.

III. SUMMARY

A clock and data recover (CDR) circuit having sampler, a digital phase detector, and a digital frequency detection circuit may be used, where the sampler receives an input signal and provides sequential samples to a digital phase detector. The digital phase detector, such as a bang-bang phase detector, detects transitions between the sequential samples and provides transition data to the digital frequency detection circuit. The digital frequency detection circuit stores the transition data and monitors the transition data to determine whether a sampling rate of the sampler needs to be increased or decreased for the CDR circuit to lock to the frequency of the input signal. The output signal from the digital frequency detection circuit results in the generation of a control signal that adjusts a frequency of the sampling clock that controls the sampling rate.

Alternatively, the digital frequency detection circuit may be configured to receive samples from a de-serializer instead of receiving transition data from the digital phase detector. For example, the sampler may provide the sequential samples to a de-serializer that packages the sequentially received sequential samples into a number of parallel samples. The de-serializer has the effect of reducing the speed required by the digital frequency detection circuit. The digital frequency detection circuit detects transitions between the samples received from the de-serializer and stores the transition data. The digital frequency detection circuit monitors the stored transition data to determine whether a sampling rate of the sampler should be increased or decreased for the CDR circuit to lock to the frequency of the input signal. The output signal from the digital frequency detection circuit results in the generation of a control signal that adjusts the frequency of a sampling clock that controls the sampling rate of the sampler. The de-serializer receives the sequential samples serially (e.g., a single sample is provided to the de-serializer each clock cycle) and provides N (an integer greater than one) samples in parallel after the N samples have been received at the de-serializer, resulting in a parallel output to the digital frequency detection circuit every Nth clock cycle. Therefore, the clock speed requirements for the digital frequency detection circuit are reduced (e.g., the clock speed requirements may be reduced by a factor of N).

In a particular embodiment, a digital circuit includes a frequency detection circuit operative to compare information related to transitions between sequential samples of a received signal. The frequency detection circuit is further operative to generate a control signal to reduce a sampling rate of the received signal in response to a predetermined number of the sequential samples having a same value. The digital circuit also includes a digital phase detector operative to provide the information related to the transitions between sequential samples to the frequency detection circuit.

In another particular embodiment, a method of recovering a clock and data from an input signal includes reducing a sampling rate of a received signal in response to a predetermined number of sequential samples of the received signal having a same value. Information related to transitions between sample values of the received signal is received from a digital phase detector.

In another particular embodiment, a digital circuit includes a frequency detection circuit operative to compare sequential samples of a received signal and to generate a control signal to reduce a sampling rate of the received signal in response to a predetermined number of the sequential samples having a same value. The digital circuit includes a de-serializer operative to convert sequential samples of the received signal to parallel data provided to the frequency detection circuit.

In another particular embodiment, a method of recovering a clock and data from an input signal includes adjusting a sampling rate of a received signal by a frequency detection circuit in response to a predetermined number of sequential samples of the received signal having a same value. The method includes detecting a clock and data recovery (CDR) lock-in of the received signal and selectively disabling the frequency detection circuit in response to detecting the CDR lock-in.

One particular advantage provided by at least one of the disclosed embodiments is a reduction in loading at an input where the CDR circuit receives the input signal and at a clock output of the CDR circuit.

Other aspects, advantages, and features of the present disclosure will become apparent after review of the entire application, including the following sections: Brief Description of the Drawings, Detailed Description, and the Claims.

IV BRIEF DESCRIPTION OF THE DRAWINGS

V. DETAILED DESCRIPTION

A clock and data recovery (CDR) circuit may be employed at a receiver to recover a clock signal and data from a received input signal, where the received input signal does not include a reference clock signal. For example, the received input signal may be a non-return to zero (NRZ) input signal that does not include a reference clock signal and that may be encoded in accordance with a standard, such as an 8b/10b standard. The pull-in time and locking time of the received input signal at the receiver affects the speed of the receiver. The pull-in time and the locking time may be improved by including a digital frequency detection circuit within the CDR circuit.

The digital frequency detection circuit may utilize transition timing information generated from sequentially sampled values at a digital phase detector to determine whether the sampling rate of the input signal needs to be adjusted in order to lock on to the frequency of the input signal. The digital frequency detection circuit may be configured to utilize aspects of the 8b/10b standard, or any other standard used, to determine whether the sampling rate is to be increased or decreased. For example, the 8b/10b standard has a minimum transition density, such that a transition must occur in the data within a predetermined number of unit intervals (UIs). Therefore, the digital frequency detection circuit may determine that the sampling rate is to be reduced when a number of consecutive non-transitions between sequential samples exceeds the minimum number of allowed non-transitions based on the minimum transition density. Alternatively, the digital frequency detection circuit may be configured to receive the sequentially sampled values in parallel from a de-serializer in the CDR circuit. In such a configuration, the clock speed of the digital frequency detection circuit may be reduced (as compared to circuits without use of the de-serializer) such that lower speed and lower cost components may be used for the digital frequency detection circuit without impacting overall performance of the CDR circuit.

Figure 1:
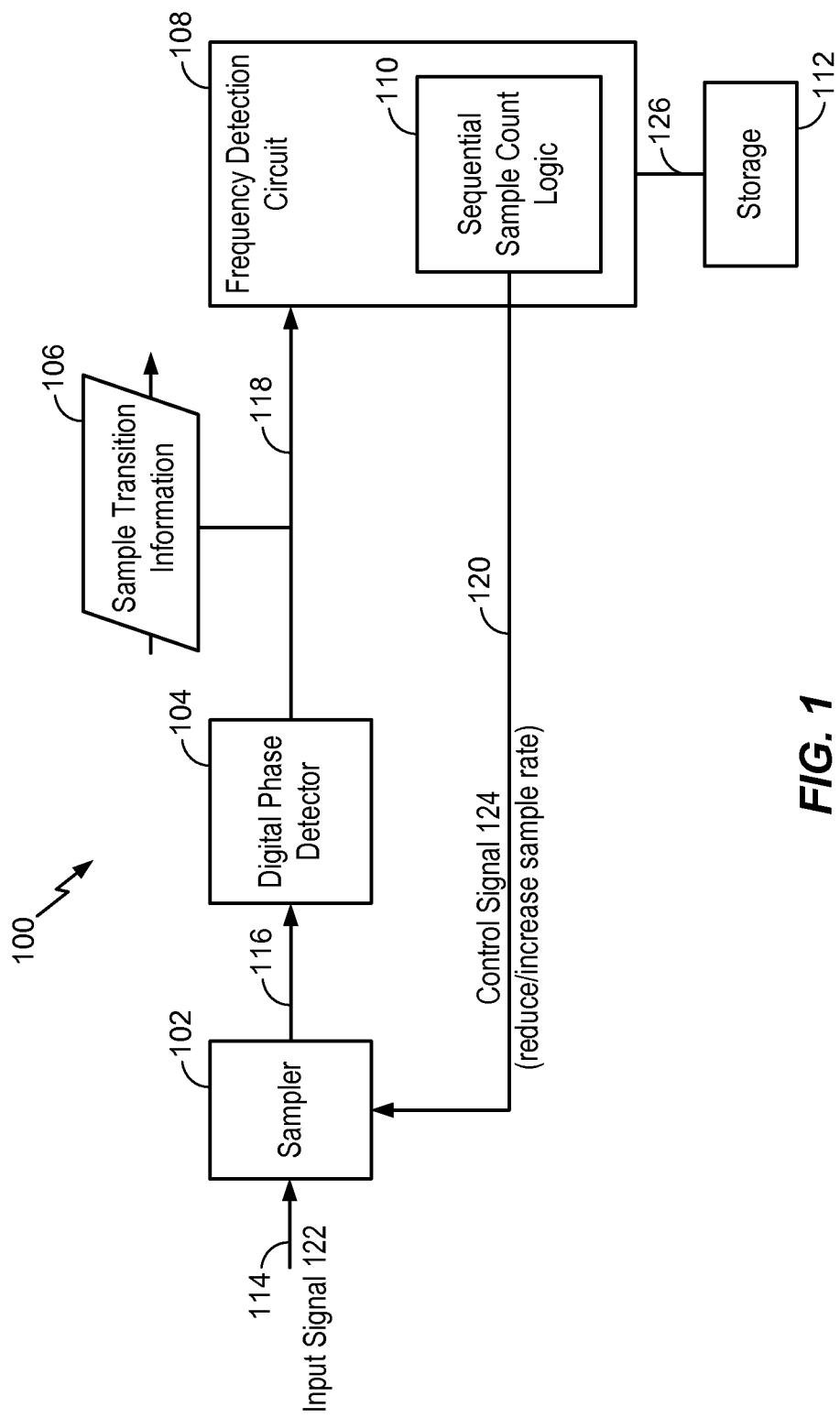
FIG. 1 is a block diagram of a particular illustrative embodiment of a digital circuit to recover a clock and data from an input signal.

Referring to FIG. 1, a particular illustrative embodiment of a digital circuit to recover a clock and data from an input signal is disclosed and generally designated 100. The digital circuit 100 includes a sampler 102, a digital phase detector 104, a frequency detection circuit 108, and storage 112. The frequency detection circuit 108 includes sequential sample count logic 110.

In a particular illustrative embodiment, the sampler 102 receives an input signal 122 via a data path 114 and samples the input signal 122 at a sampling rate controlled by a control signal 124. In a particular illustrative embodiment, the sampling rate at the sampler 102 may be greater than three gigahertz. Alternatively, the sampling rate may be less than or equal to three gigahertz. The input signal 122 may be a differential signal (e.g., two complimentary signals) or a single signal and does not include a reference signal (e.g., a clock signal) for determining the frequency of the input signal 122. The input signal 122 may also be encoded as non-return-to-zero (NRZ) line code. The sampler 102 may include a rate control input that receives the control signal 124 via a data path 120. The sampled values are sequentially provided to the digital phase detector 104 via a data path 116. The digital phase detector 104 determines whether the input signal 122 is out of phase with a sampling clock based on the sequentially sampled values, where the sampling clock of the sampler 102 is controlled by the control signal 124. The digital phase detector 104 monitors the sequentially sampled values for transitions in the input signal 122 and provides sample transition information 106 (e.g., information related to transitions between sequentially sampled values) to the frequency detection circuit 108.

The frequency detection circuit 108 may be coupled to the storage 112 via a data path 126. Alternatively, the storage 112 may be located within the frequency detection circuit 108. The storage 112 receives and stores the sample transition information 106. The stored sample transition information may be used by the frequency detection circuit 108 to generate the control signal 124 to adjust the sampling rate at the sampler 102 for sampling the input signal 122. For example, the frequency detection circuit 108 may include sequential count logic 110 that examines the stored sample transition information 106 and provides control signal 124 to reduce the sampling rate of the sampler 102 when a predetermined number of sequentially sampled values have the same value. The sequential count logic 110 may also provide a control signal 124 to increase the sampling rate of the sampler 102 when a predetermined number of transitions occur between a sampling pair.

When the control signal 124 is provided to the sampler 102 at the rate control input, the sampling rate of the sampler 102 is adjusted accordingly and sequentially sampled values at the new sampling rate are provided to the digital phase detector 104. The digital phase detector 104 provides sample transition information 106 to the frequency detection circuit 108 based on the sampled values provided at the new sampling rate, and the sample transition information 106 is provided to the storage 112. The frequency detection circuit 108 monitors the stored sample transition information 106 to determine whether the sampling rate needs to be adjusted. For example, the frequency detection circuit 108 determines whether the sampling clock that controls the sampling rate is too fast or too slow. The frequency detection circuit 108 adjusts the sampling rate accordingly with the control signal 124. This procedure is repeated until the frequency of the input signal 122 is locked on to.

The digital circuit 100 avoids additional loading at the data path 114 where the input signal is received by the sampler 102 by providing the frequency detection circuit 108 as part of the loop created by the components and data paths of the digital circuit 100. Further, the digital circuit 100 also saves area and processing resources by providing sample transition timing information 106 generated by the digital phase detector 104 to the frequency detection circuit 108 (rather than using a separate transition detection circuit).

Figure 2:
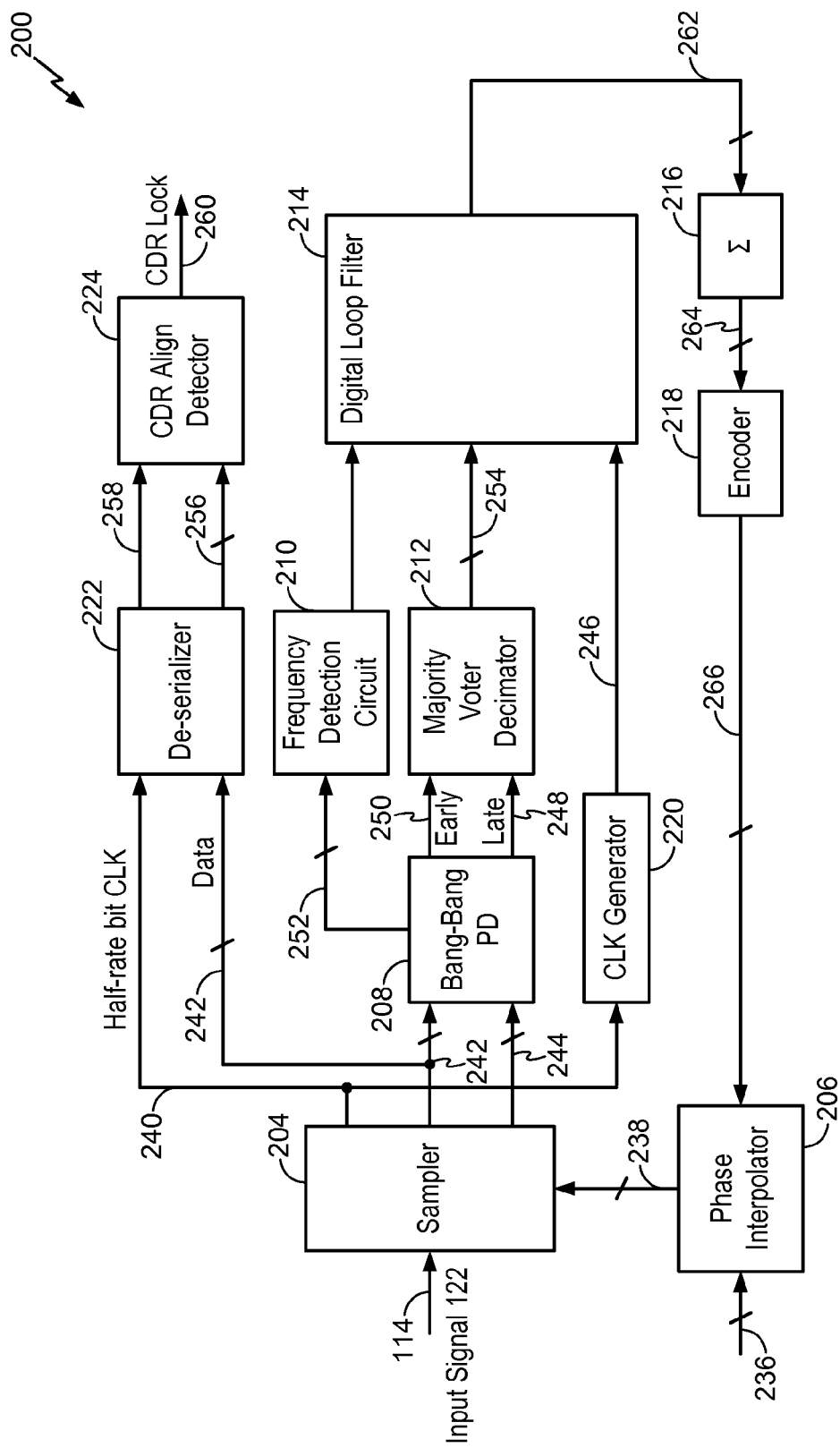
FIG. 2 is a block diagram of a second particular illustrative embodiment of a digital circuit to recover a clock and data from an input signal.

Referring to FIG. 2, a particular illustrative embodiment of a digital circuit to recover a clock and data from an input signal is disclosed and generally designated 200. The digital circuit 200 includes a sampler 204, a phase interpolator 206, a bang-bang phase detector (PD) 208, a frequency detection circuit 210, a majority voter decimator 212, a digital loop filter 214, an integrator 216, an encoder 218, a clock generator 220, a de-serializer 222, and a clock-data recovery (CDR) align detector 224.

In a particular illustrative embodiment, the sampler 204 receives an input signal 122 via a data path 114 and samples the input signal 122 at a sampling rate to provide sequentially sampled values. In a particular illustrative embodiment, the sampling rate at the sampler 204 may be greater than three gigahertz. Alternatively, the sampling rate may be less than or equal to three gigahertz. The sampling rate may be controlled by a multi-phase clock signal provided by the phase interpolator 206 via a data path 238. For example, the multi-phase clock signal may provide four clock signals where a first clock signal is shifted zero ("0") degrees, a second clock signal is shifted ninety ("90") degrees out of phase, a third clock signal is shifted one hundred and eighty ("180") degrees out of phase, and a fourth clock signal is shifted two hundred seventy ("270") degrees out of phase. The phase interpolator 206 may receive a reference multiphase clock signal from a multi-phase clock source such as a phase-locked loop via a data path 236 to provide a reference phase for the multiphase clock signal provided to the sampler 204. The phase interpolator 206 may also be configured to receive a control signal via a data path 266 that adjusts the phase and frequency of the multiphase clock signal provided to the sampler 204.

The sequentially sampled values at the sampler 204 are provided to a phase detector, such as the bang-bang phase detector 208, via a data path 242 and a data path 244. The sampled values provided via the data path 242 correspond to bit cell center samples and the sampled values provided via the data path 244 correspond to bit cell transition samples. The bang-bang phase detector 208 uses the sequentially sampled values to detect transitions in the input signal 122 and provides sample transition information (e.g., information related to transitions between sequentially sampled values) to the frequency detection circuit 210 via a data path 252. For example, the sample transition information may provide a first logic value (e.g., a logic value of one) when a transition occurs between two sequential samples and a second logic value (e.g., a logic value of zero) when no transition occurs between two consecutive samples. The frequency detection circuit stores the sample transition information and uses the stored sample transition information to determine whether the sampling rate needs to be increased or reduced to match the base frequency of the input signal 122. The frequency detection circuit 210 provides a signal to the digital loop filter 214, where the signal indicates whether the sampling rate needs to be increased or decreased.

The bang-bang phase detector 208 also provides an early signal via a data path 250 and a late signal via a data path 248 to the majority voter decimator 212, where an asserted early signal indicates that the sampling clock is early and an asserted late signal indicates that the sampling clock is late. The majority voter decimator 212 counts the number of early and late assertions and determines whether the early or late assertions have the highest count. The majority voter decimator 212 may be configured to pre-filter the signal associated with the highest count (e.g., early signal or late signal) to avoid aliasing and then downsample the selected signal. The downsampled signal is provided from the majority voter decimator 212 to the digital loop filter 214 via a data path 254, and the downsampled signal indicates whether the phase of the sampling clock is early or late.

The digital loop filter 214 receives the signal from the frequency detection circuit 210 indicating that the sampling rate is either too slow or too fast and a signal from the majority voter decimator 212 indicating that the sampling clock is either early or late. The digital loop filter 214 may also receive a clock signal from a clock generator 220 via a data path 246 to control the clock rate of the digital loop filter 214, and the clock generator 220 receives a half-rate bit clock from the sampler 204 via a data path 240. The phase and frequency of the half-rate bit clock may be controlled by the phase interpolator 206. The digital loop filter 214 generates a control signal based on the signals received from the frequency detection circuit 210 and the bang-bang PD 208 (via the majority voter decimator 212), where the control signal includes information to adjust the sampling rate at the sampler 204 and the phase of the sampling clock signals with respect to the input signal 122.

Depending on the configuration and components used, the control signal may need to be appropriately formatted to be used by the phase interpolator 206. For example, in a particular illustrative embodiment, the control signal may be applied to a summation circuit 216 via a data path 262 and then to an encoder 218 via a data path 264. The encoder 218 encodes the control signal so that each of the four clock signals provided by the phase interpolator 206 may be appropriately adjusted in phase and frequency. The encoder 218 provides an encoded control signal to the phased interpolator 206 via the data path 266.

The sampler 204 provides sequentially sampled values corresponding to bit cell center samples via the data path 242 to the de-serializer 222. A bit cell represents a unit interval of the input signal 122, where the bit cell center represents the center of that unit interval and a bit cell transition represents the boundary of the unit interval where a first unit interval switches to a sequential second unit interval. The sampler 204 may also provide a half-rate bit clock to the de-serializer 222 via the data path 240, and the phase and frequency of the half-rate bit clock may be controlled by the phase interpolator 206. For example, adjustments made to the phase and frequency of the multiphase clock signal of the phase interpolator 206 in response to the control signal provided by the digital loop filter 214 propagate through to the half-rate bit clock that is provided by the sampler 204 based on the multiphase clock signal received at the sampler 204. The de-serializer 222 receives the sequentially sampled values and provides a number of the sequentially sampled values in parallel at an output of the de-serializer 222 to the CDR align detector 224 via a data path 256. For example, ten sequentially sampled data values may be provided in parallel at the output of the de-serializer 222. A clock signal may also be provided from the de-serializer 222 to the CDR align detector 224 via a data path 258, and the frequency of the clock signal is reduced to allow time for deserialization of the sequentially sampled values received at the higher frequency half-rate bit clock. The CDR align detector 224 monitors the received parallel samples and corresponding clock signal and determines whether a CDR lock has successfully been achieved. A CDR lock signal may be provided by the CDR align detector 224 via a data path 260 to indicate that a CDR lock has been achieved.

Figure 3:
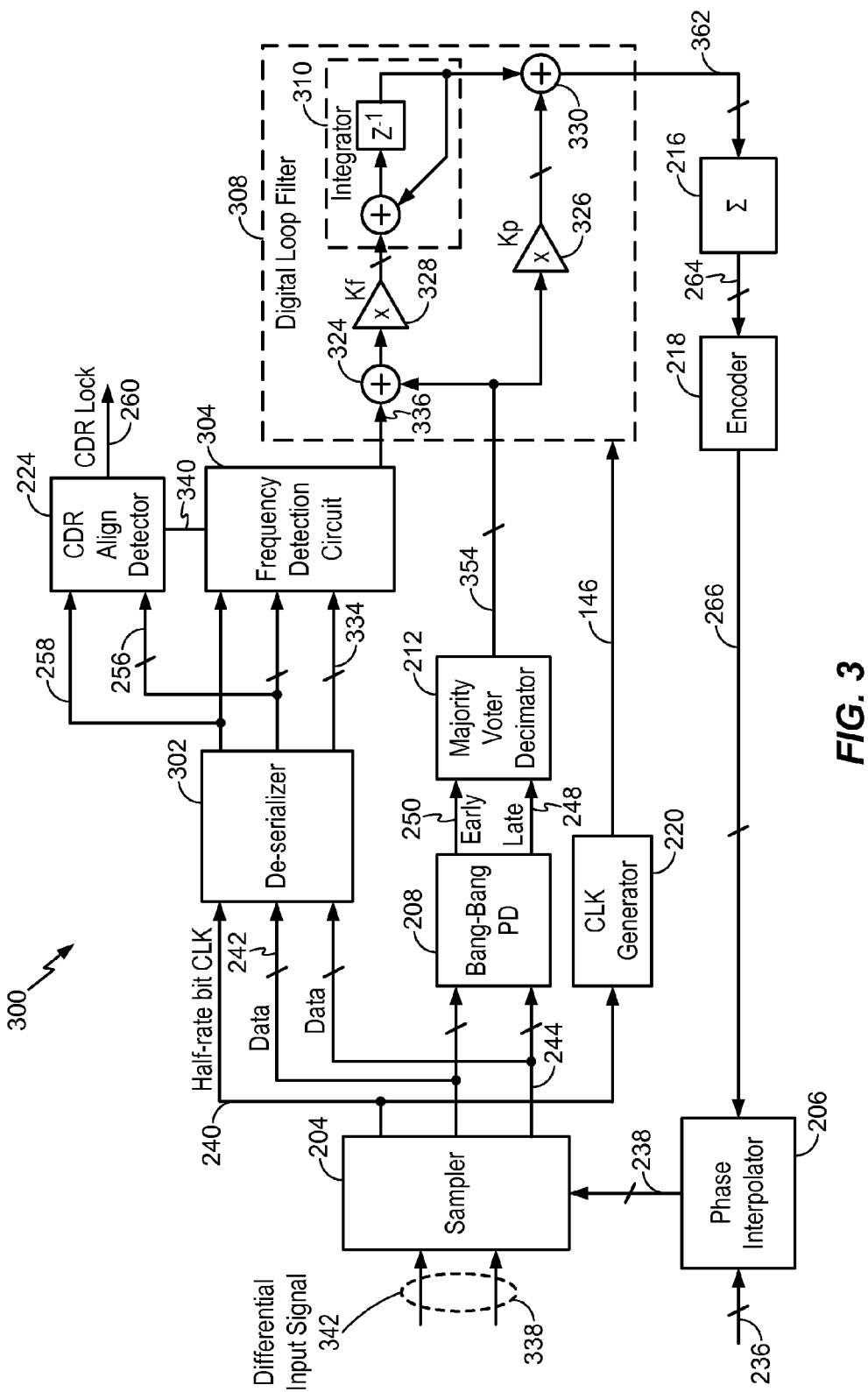
FIG. 3 is a block diagram of a third particular illustrative embodiment of a digital circuit to recover a clock and data from an input signal.

Referring to FIG. 3, a particular illustrative embodiment of a digital circuit to recover a clock and data from an input signal is disclosed and generally designated 300. The digital circuit 300 includes the sampler 204, the phase interpolator 206, the bang-bang phase detector (PD) 208, a frequency detection circuit 304, the majority voter decimator 212, a digital loop filter 308, the integrator 216, the encoder 218, the clock generator 220, a de-serializer 302, and the clock-data recovery (CDR) align detector 224.

In a particular illustrative embodiment, the sampler 204 receives a differential input signal 342, such as an NRZ line code differential input signal, via a pair of data paths 338. The sampler 204 samples the differential input signal 342 at a sampling rate to provide sequentially sampled values. In a particular illustrative embodiment, the sampling rate at the sampler 204 may be greater than three gigahertz. Alternatively, the sampling rate may be less than or equal to three gigahertz. The sampling rate may be controlled by a multiphase clock signal provided by the phase interpolator 206 via a data path 238. The phase interpolator 206 may receive a reference multiphase clock signal from a multi-phase clock source such as a phase-locked loop via the data path 236 to provide a reference phase for the multiphase clock signal provided to the sampler 204. The phase interpolator 206 may also be configured to receive a control signal via the data path 266 that adjusts the phase and frequency of the multiphase clock signal provided to the sampler 204.

The sequentially sampled values at the sampler 204 are provided to a phase detector, such as the bang-bang phase detector 208, via the data path 242 and the data path 244. The sampled values provided via the data path 242 correspond to bit cell center samples and the sampled values provided via the data path 244 correspond to bit cell transition samples. The bang-bang phase detector 208 provides an early signal via the data path 250 and a late signal via the data path 248 to the majority voter decimator 212, where an asserted early signal indicates that the sampling clock is early and an asserted late signal indicates that the sampling clock is late. The majority voter decimator 212 counts the number of early and late assertions and determines whether the early or late assertions have the highest count. The majority voter decimator 212 may be configured to pre-filter the signal associated with the highest count (e.g., early signal or late signal) to avoid aliasing and then downsample the selected signal. The downsampled signal is provided from the majority voter decimator 212 to the digital loop filter via a data path 354, where the downsampled signal indicates whether the phase of the sampling clock is early or late.

The sampler 204 provides sampled values to the de-serializer 302 via the data path 242 corresponding to bit cell center samples and via the data path 244 corresponding to bit cell transition samples. The sampler 204 may also provide a half-rate bit clock to the de-serializer 302 via the data path 240, where the phase and frequency of the half-rate bit clock may be controlled by the phase interpolator 206. The de-serializer 302 receives the sequentially sampled values corresponding to bit cell center samples and provides a number of the bit cell center samples in parallel at the output of the de-serializer 302 to the frequency detection circuit 304 and to the CDR align detector 224 via the data path 256. The de-serializer 302 also receives the sequentially sampled values corresponding to bit cell transition samples and provides a number of the bit cell transition samples in parallel at the output of the de-serializer 302 to the frequency detection circuit 304 via a data path 334. A clock signal may also be provided from the de-serializer 302 to the frequency detection circuit 304 and to the CDR align detector 224 via a data path 258, where the frequency of the clock signal is reduced to allow time for deserialization of the sequentially sampled values received at the higher frequency half-rate bit clock. The reduced clock speed at the frequency detection circuit 304 reduces the operating speed requirements of the frequency detection circuit 304 such that lower speed and lower cost components may be used without degrading the overall speed of the digital circuit 300.

The frequency detection circuit 304 compares the bit cell center samples to the bit cell transition samples to generate sample transition information. The generated sample transition information is stored in storage coupled to, or included in, the frequency detection circuit 304. The storage may be an array of latching elements, such as flip-flops. The frequency detection circuit 304 monitors the stored sample transition information to determine whether the sampling clock at the sampler 204 is too fast or too slow. A signal is provided from the frequency detection circuit 304 to the digital loop filter 308 via a data path 336.

The digital loop filter 308 may include a summing circuit 324, a first multiplier 328 that multiplies the sum of the signal provided from the frequency detection circuit 304 and the majority voter decimator 212 with an integral gain constant Kf. The signal provided by the majority voter decimator 212 to the digital loop filter 308 may also be applied to a second multiplier 326 that multipliers the received signal with a proportional gain constant Kp. The output of the first multiplier 328 is provided to an integrator 310. The output of the integrator 310 and the output of the second multiplier 326 are summed at a second summing circuit 330. The output of the summing circuit 330 may be a control signal that includes information to adjust the frequency and phase of the sampling clock signals at the sampler 204 with respect to the differential input signal 342. The control signal may be provided to the summation circuit 216 via a data path 362 and then to the encoder 218 via the data path 264. The encoder 218 encodes the control signal so that each of the four clock signals provided by the phase interpolator 206 may be appropriately adjusted in phase and frequency. The encoder 218 provides an encoded control signal to the phase interpolator 206 via the data path 266.

The CDR align detector 224 monitors the received parallel samples and corresponding clock signal and determines whether a CDR lock has successfully been achieved. A CDR lock signal may be provided by the CDR align detector 224 via a data path 260 to indicate that a CDR lock has been achieved. The CDR align detector 224 may provide a control signal to the frequency detection circuit 304 via a data path 340 to power down the frequency detection circuit 304 when a CDR lock has been achieved. Powering down the frequency detection circuit 304 when it is no longer needed reduces power consumption at the digital circuit 300.

Figure 4:
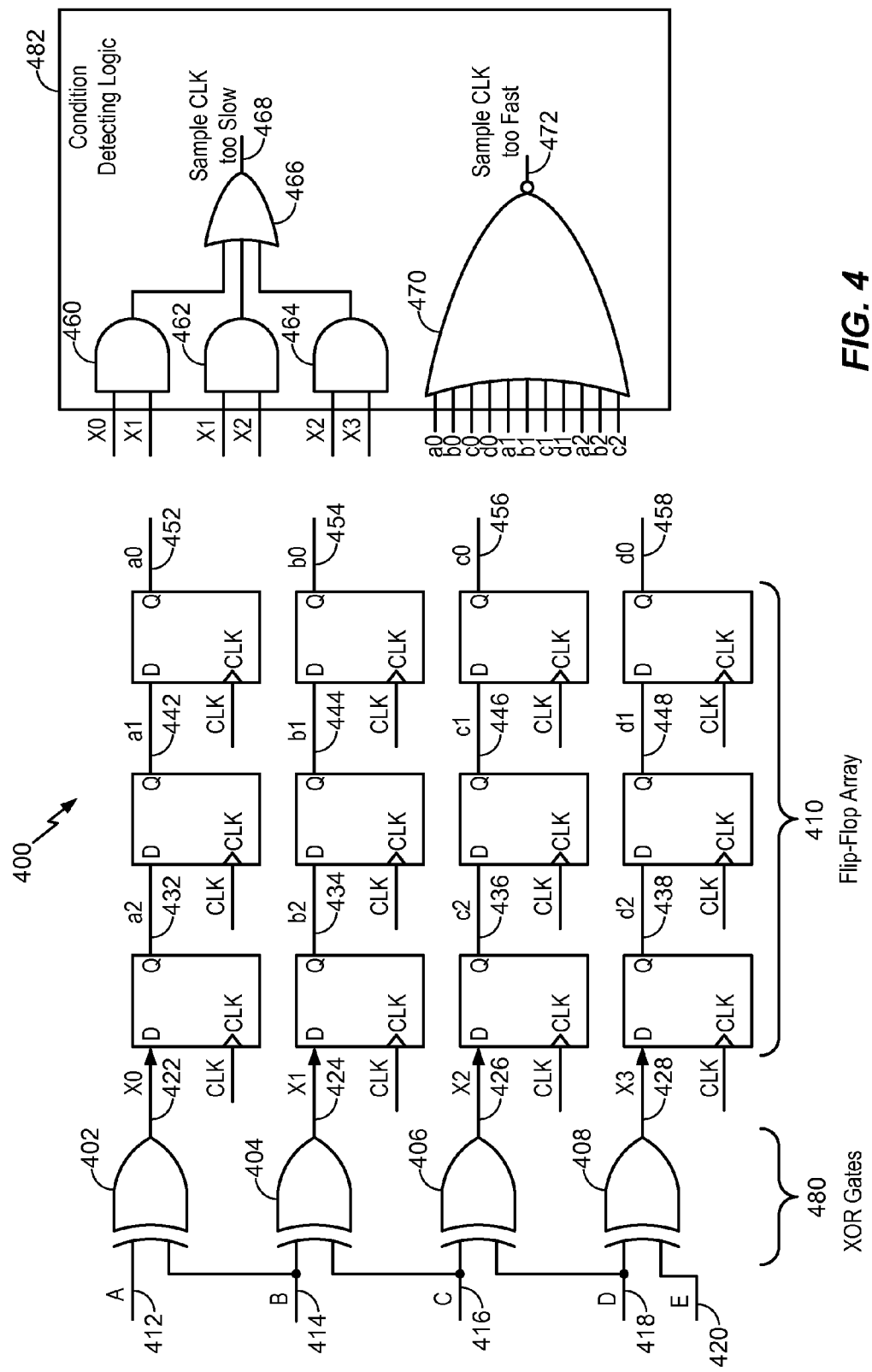
FIG. 4 is a block diagram of a particular illustrative embodiment of a digital circuit to generate, store, and monitor sampled transition information.

Referring to FIG. 4, a particular illustrative embodiment of a digital circuit to determine whether the frequency of a sampling clock is too fast or too slow is illustrated and generally designated 400. The digital circuit 400 may include XOR gates 480, a flip-flop array 410, and condition detecting logic 482. The XOR gates 480 may include XOR gates 402-

408. The XOR gate 402 receives a sample value A via a data path 412 and a sample value B via a data path 414, where the sample value A corresponds to a bit cell center sample and the sample value B corresponds to a bit cell transition sample. The XOR gate 402 provides a transition value X0 to the flip-flop array 410 via a data path 422, where a logic value of one indicates that there is a transition between sample value A and sample value B and a logic value of zero indicates that there is no transition between sample values A and B.

The XOR gate 404 receives the sample value B via the data path 414 and a sample value C via a data path 416, where the sample value C corresponds to a bit cell center sample and the sample value B corresponds to a bit cell transition sample. The XOR gate 404 provides a transition value X1 to the flip-flop array 410 via a data path 424. A logic value of one indicates that there is a transition between sample value B and sample value C and a logic value of zero indicates that there is no transition between sample values B and C.

The XOR gate 406 receives the sample value C via the data path 416 and a sample value D via a data path 418, where the sample value C corresponds to a bit cell center sample and the sample value D corresponds to a bit cell transition sample. The XOR gate 406 provides a transition value X2 to the flip-flop array 410 via a data path 426. A logic value of one indicates that there is a transition between sample value C and sample value D, and a logic value of zero indicates that there is no transition between sample values C and D.

The XOR gate 408 receives the sample value D via the data path 418 and a sample value E via a data path 420, where the sample value E corresponds to a bit cell center sample and the sample value D corresponds to a bit cell transition sample. The XOR gate 408 provides a transition value X3 to the flip-flop array 410 via a data path 428. A logic value of one indicates that there is a transition between sample value D and sample value E, and a logic value of zero indicates that there is no transition between sample values D and E.

In a particular illustrated embodiment, the flip-flop array 410 includes twelve flip-flops where each flip-flop retains a transition value and the transition values, X0-X3, are clocked through the flip-flop array based on a common clock signal. For example, a2 may represent a transition value at a data path 432, b2 may represent a transition value at a data path 434, c2 may represent a transition value at a data path 436, d2 may represent a transition value at a data path 438, a1 may represent a transition value at a data path 442, b1 may represent a transition value at a data path 444, c1 may represent a transition value at a data path 446, d1 may represent a transition value at a data path 448, a0 may represent a transition value at a data path 452, b0 may represent a transition value at a data path 454, c0 may represent a transition value at a data path 456, and d0 may represent a transition value at a data path 458, as shown.

The transition values X0-X3 and the retained transition values a0-c2 are provided to condition detecting logic 482 to determine whether the sampling clock is too fast or too slow, where a logic value of one at the transition values X0-X3 and the retained transition values a0-c2 represents a transition. For example, AND gate 460 receives transition values X0 and X1 to determine whether there are two sequential transitions in the sequentially sampled data values, such as transitions between sample values A and B and sample values B and C. AND gate 462 receives transition values X1 and X2 to determine whether there are two sequential transitions in the sequentially sampled data values, such as transitions between sample values B and C and sample values C and D. AND gate 464 receives transition values X2 and X3 to determine whether there are two sequential transitions in the sequentially sampled data values, such as transitions between sample values C and D and sample values D and E. A logic value of one at the output of any one of the AND gates 460-464 indicates that there are two sequential transitions in the sequentially sampled data values. The output of the AND gates 460-464 are provided to an OR gate 466 and a logic value of one at an output of the OR gate 466 via a data path 468 indicates that the sampling rate provided by the sampling clock is too slow.

Some encoding schemes, such as 8b/10b, may require a transition within a predetermined number of unit intervals (UIs). In other words, the data transmitted may only contain up to a predetermined number of sequential logic ones or sequential logic zeros, where the predetermined number depends on the encoding scheme being used. One or more of the retained transition values a0-c2 may be provided to a NOR gate 470 at the condition detecting logic 482. The number of inputs at the NOR gate 470 may depend upon the maximum number of unit intervals allowed without a transition as determined by the encoding scheme being used. For example, 8b/10b encoding scheme allows a maximum of five sequential unit intervals to have the same value. To monitor five sequential unit intervals, the NOR gate 470 may be configured to monitor eleven of the retained values, such as the retained transition values a0-c2, where each retained value represents a transition value between a bit cell center sample and a bit cell transition sample. A logic value of one at the output of the NOR gate 472 is a result of a logic value of zero at each retained transition value a0-c2 and indicates that the sampling rate of the sampling clock is too fast since the maximum number of allowed transitions of the received data is known.

Figure 5:
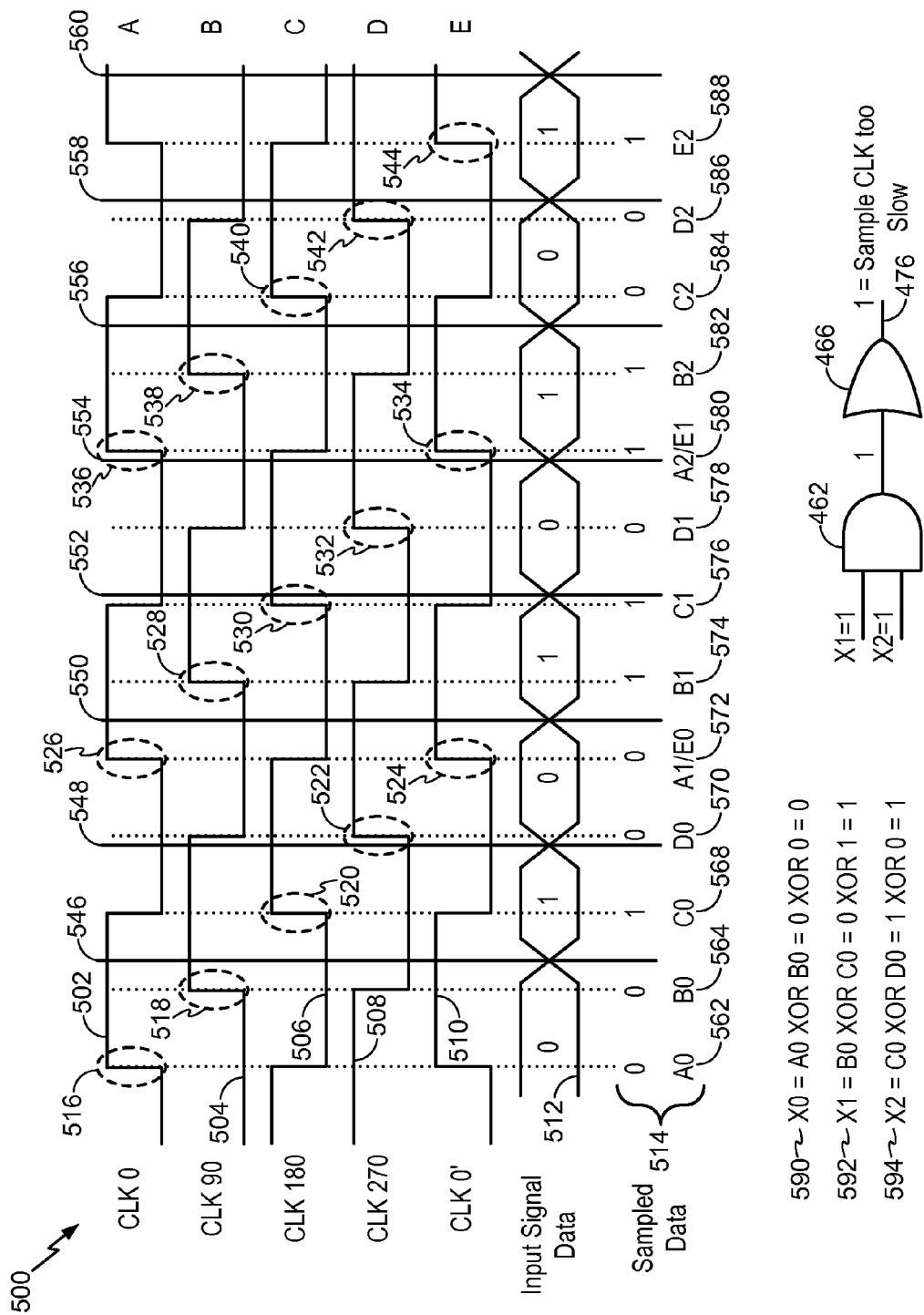
FIG. 5 is a waveform diagram showing a scenario in which a sampling clock is too slow relative to an input signal.

Referring to FIG. 5, a particular illustrative embodiment of a waveform diagram is illustrated and generally designated 500, where the waveform diagram 500 shows the multiphase sampling clock waveforms, the received data waveform, and the corresponding sampled data values. The bolded lines 546, 548, 550, 552, 554, 556, 558, and 560 represent transitions in the input signal data 512. The waveform diagram 500 provides a scenario in which the sampling clock is too slow.

The multiphase sampling clock is represented by a CLK0 waveform 502, a CLK90 waveform 504 a CLK 180 waveform 506, a CLK270 waveform 508, and a CLK0' waveform 510. The multiphase sampling clock may be provided by the phase interpolator 206 to the sampler 204 of FIG. 2 or 3. The sampler 204 may use the multiphase sampling clock to sample the input signal 512 where rising edges of the clock waveforms 502-510 (e.g., rising edges 516-544) indicate the point at which a sample is taken by the sampler 204. The CLK0 waveform 502 is a multiphase clock sampling waveform having a zero degree phase shift and the data values sampled in accordance with the CLK0 waveform 502 correspond to a sampled data value group A (e.g., sampled data values A0 562, A1 572, and A2 580). The CLK90 waveform 504 is a multiphase clock sampling waveform having a ninety degree phase shift and the data values sampled in accordance with the CLK90 waveform 504 correspond to a sampled data value group B (e.g., sampled data values B0 564, B1 574, and B2 582). The CLK180 waveform 506 is a multiphase clock sampling waveform having a one hundred and eighty degree phase shift and the data values sampled in accordance with the CLK180 waveform 506 correspond to a sampled data value group C (e.g., sampled data values C0 568, C1 576, and C2 584). The CLK270 waveform 508 is a multiphase clock sampling waveform having a two hundred and seventy degree phase shift and the data values sampled in accordance with the CLK270 waveform 508 correspond to a sampled data value group D (e.g., sampled data values D0 570, D1 578, and D2 586). The CLK0' waveform 510 is a multiphase clock sampling waveform in phase with the CLK0 waveform 502 and the data values sampled in accordance with the CLK0' waveform 510 correspond to a sampled data value group E (e.g., sampled data values E0 572, E1 580, and E2 588).

In a particular illustrative embodiment, the sampler 204 of FIG. 2 samples the input signal 122 on the rising edge of the multiphase clock signal. For example, rising edges 516, 526, and 536 indicate that the sampler 204 has sampled the input signal for sampled data value group A. Rising edges 518, 528, and 538 indicate that the sampler 204 has sampled the input signal for sampled data value group B. Rising edges 520, 530, and 540 indicate that the sampler 204 has sampled the input signal for sampled data value group C. Rising edges 522, 532, and 542 indicate that the sampler 204 has sampled the input signal for sampled data value group D. Rising edges 524, 534, and 544 indicate that the sampler 204 has sampled the input signal for sampled data value group E.

At the rising edge 516, the input signal data 512 has a logic value of zero such that the sampled data value A0 562 of the sampled data 514 is zero. At the rising edge 518, the input signal data 512 has a logic value of zero such that the sampled data value B0 564 of the sampled data 514 is zero. After the sampled data value B0 564 is sampled, a transition in the input signal data 512 occurs as identified by the bolded line 546. At the rising edge 520, the input signal data 512 has a logic value of one such that the sampled data value C0 568 of the sampled data 514 is one. After the sampled data value C0 568 is sampled, a transition in the input signal data 512 occurs as identified by the bolded line 548. At the rising edge 522, the input signal data 512 has a logic value of zero such that the sampled data value D0 570 of the sampled data 514 is zero. At the rising edge 524, the input signal data 512 has a logic value of zero such that the sampled data value A1/E0 572 of the sampled data 514 is zero. After the sampled data value A1/E0 572 is sampled, a transition in the input signal data 512 occurs as identified by the bolded line 550. The sampling of the input signal 512 continues at the sampler 204 as shown in the waveform diagram 500.

As the input signal 512 is sampled, the resulting sampled data 514 may be provided to the XOR Gates 480 of FIG. 4 to produce transition values X0 590, X1 592, X2 594, and X3 596. In the particular illustrative embodiment of FIG. 5, the transition value X0 590 has a logic value of zero indicating that a transition did not occur between the sampled data values A0 562 and B0 564. The transition value X1 592 has a logic value of one indicating that a transition did occur between the sampled data values B0 564 and C0 568. The transition value X2 594 has a logic value of one indicating that a transition did occur between the sampled data values C0 568 and D0 570. The transition value X3 596 has a logic value of zero indicating that a transition did not occur between the sampled data values D0 570 and E0 572. The resulting transition values X0 590, X1 592, X2 594, and X3 596 are provided to the AND gates 460, 462, and 464 of the condition detecting logic 482 of FIG. 4. The transition values X1 and X2 each have a logic value of one such that the AND gate 462 outputs a logic value of one to the OR gate 466. The OR gate 466 also outputs a logic value of one at the data path 476 that indicates that the sampling rate of the sampling clock is too slow because two transitions occurred between the rising edge 518 and the rising edge 522 (e.g., two transitions occurred within half the period of the clock signal).

The value at the data path 476 indicating that the sample rate, or frequency of the sampling clock (e.g., where the sampling clock is represented by the multiphase clock waveforms 502-510), is too slow may be used to increase the frequency of the sampling clock provided to the sampler 204 of FIG. 2 or 3. Increasing the frequency of the sampling clock increases the sampling rate at the sampler 204.

Figure 6:
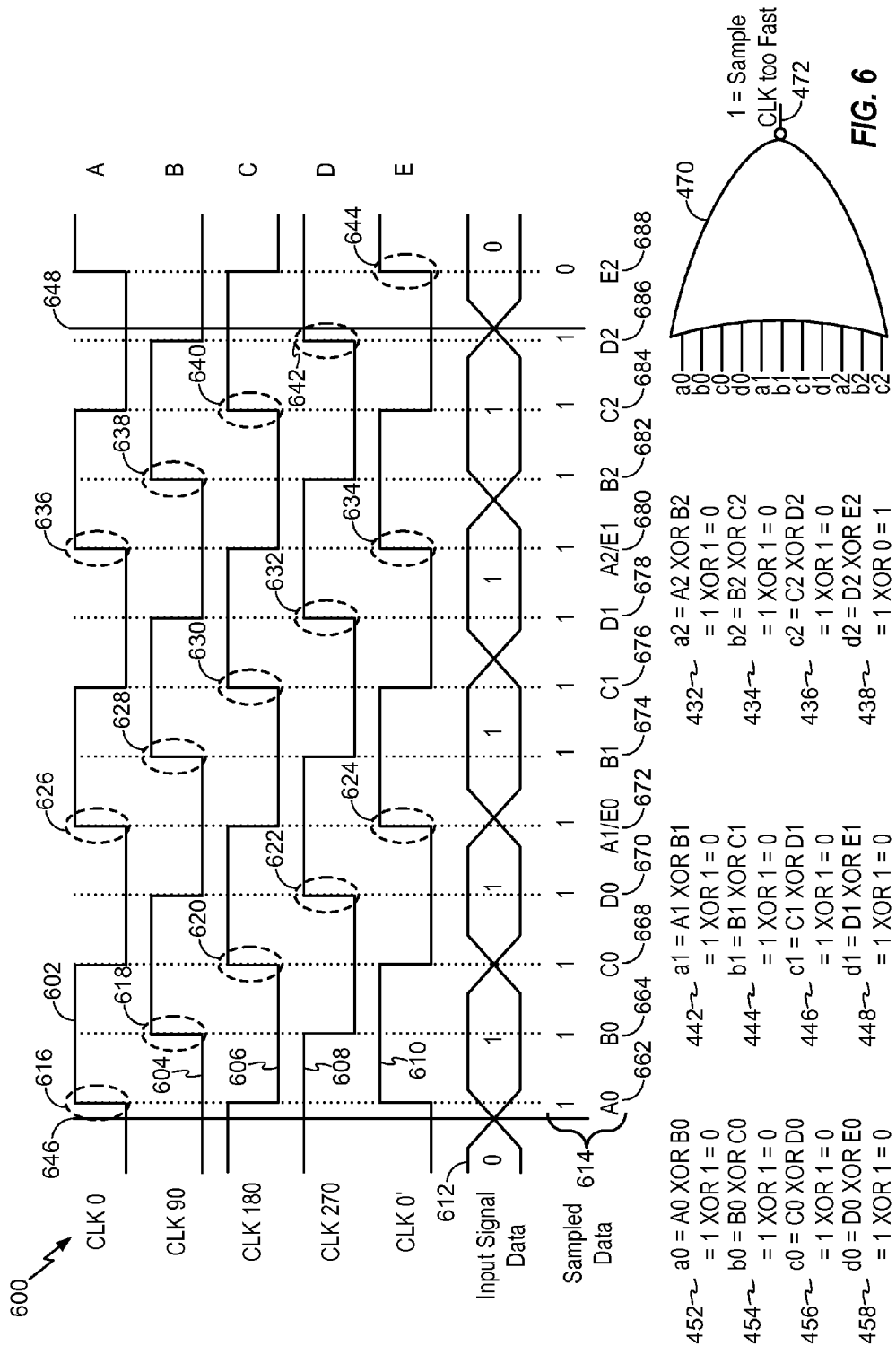
FIG. 6 is a waveform diagram showing a scenario in which a sampling clock is too fast relative to an input signal.

Referring to FIG. 6, a particular illustrative embodiment of a waveform diagram is illustrated and generally designated 600. The waveform diagram 600 shows the multiphase sampling clock waveforms, the received data waveform, and the corresponding sampled data values. The bolded lines 646 and 648 represent transitions in the input signal data 612. The waveform diagram 600 provides a scenario in which the sampling clock is too fast.

The CLK0 waveform 602 is a multiphase clock sampling waveform having a zero degree phase shift and the sampled data values provided by the CLK0 waveform 602 correspond to a sampled data value group A (e.g., sampled data values A0 662, A1 672, and A2 680). The CLK90 waveform 604 is a multiphase clock sampling waveform having a ninety degree phase shift and the sampled data values provided by the CLK90 waveform 604 correspond to a sampled data value group B (e.g., sampled data values B0 664, B1 674, and B2 682). The CLK180 waveform 606 is a multiphase clock sampling waveform having a one hundred and eighty degree phase shift and the sampled data values provided by the CLK180 waveform 606 correspond to a sampled data value group C (e.g., sampled data values C0 668 C1 676, and C2 684). The CLK270 waveform 608 is a multiphase clock sampling waveform having a two hundred and seventy degree phase shift and the sampled data values provided by the CLK270 waveform 608 correspond to a sampled data value group D (e.g., sampled data values D0 670, D1 678, and D2 686). The CLK0' waveform 610 is a multiphase clock sampling waveform in phase with the CLK0 waveform 602 and the sampled data values provided by the CLK0' waveform 610 correspond to a sampled data value group E (e.g., sampled data values E0 672, E1 680, and E2 688).

In a particular illustrative embodiment, the sampler 204 of FIG. 2 samples the input signal 612 on the rising edge of the multiphase clock signal. For example, rising edges 616, 626, and 636 indicate that the sampler 204 has sampled the input signal for sampled data value group A. Rising edges 618, 628, and 638 indicate that the sampler 204 has sampled the input signal for sampled data value group B. Rising edges 620, 630, and 640 indicate that the sampler 204 has sampled the input signal for sampled data value group C. Rising edges 622, 632, and 642 indicate that the sampler 204 has sampled the input signal for sampled data value group D. Rising edges 624, 634, and 644 indicate that the sampler 204 has sampled the input signal for sampled data value group E.

Prior to the rising edge 616, a transition in the input signal data 612 occurs as identified by the bolded line 646. At the rising edges 616-642, the input signal data 612 maintains a logic value of one over five unit intervals such that the sampled data values A0 662 through D2 686 of the sampled data 614 are one. After the sampled data value D2 686 is sampled, a transition in the input signal data 612 occurs as identified by the bolded line 648. The sampling of the input signal 122 continues at the sampler 204 as shown in the waveform diagram 600.

As the input signal 612 is sampled, the resulting sampled data 614 is provided to the XOR Gates 480 of FIG. 4. The XOR gates 480 produce transition values X0, X1, X2, and X3 that are then clocked through to the flip-flop array 410. The retained transition value a0 at the data path 452 corresponds to sampled data value A0 662 XORed with sampled data value B0 664. The retained transition value b0 at the data path 454 corresponds to sampled data value B0 664 XORed with sampled data value C0 668. The retained transition value c0 at the data path 456 corresponds to sampled data value C0 668 XORed with sampled data value D0 670. The retained transition value d0 at the data path 458 corresponds to sampled data value D0 670 XORed with sampled data value E0 672. The retained transition value a1 at the data path 442 corresponds to sampled data value A1 672 XORed with sampled data value B1 674. The retained transition value b at the data path 444 corresponds to sampled data value B1 674 XORed with sampled data value C1 676. The retained transition value c1 at the data path 446 corresponds to sampled data value C1 676 XORed with sampled data value D1 678. The retained transition value d1 at the data path 448 corresponds to sampled data value D1 678 XORed with sampled data value E1 680. The retained transition value a2 at the data path 432 corresponds to sampled data value A2 680 XORed with sampled data value B2 682, the retained transition value b2 at the data path 434 corresponds to sampled data value B2 682 XORed with sampled data value C2 684. The retained transition value c2 at the data path 436 corresponds to sampled data value C2 684 XORed with sampled data value D2 686. The retained transition value d2 at the data path 438 corresponds to sampled data value D2 686 XORed with sampled data value E2 688.

In a particular illustrative embodiment, the encoding scheme corresponds to 8b/10b in which a maximum of five sequential unit intervals may have the same logic value. In FIG. 6, each of the retained transition values a0-c2 have a logic value of zero indicating that a transition at the input signal data 612 did not occur between the sampled data values A0 662 and D2 686. The retained transition values a0-c2 are provided as inputs to the NOR gate 270 resulting in an output at the data path 472 having a logic value of one that indicates that the sample rate of the sampling clock is too fast. The sample rate of the sampling clock is too fast because the maximum number of transition values that should be present, if the sampling clock were operating at the appropriate frequency, are ten or less, whereas FIG. 6 illustrates twelve sequentially sampled values having the same value resulting in eleven sequential transition values having a logic value of zero.

The value indicating that the sample rate of the sampling clock is too fast may be provided from the frequency detection circuit 210 of FIG. 2 to the digital loop filter 214 and may be used by the digital loop filter 214 to generate a control signal to decrease the sampling rate of the sampling clock signal provided to the sampler 204 from the phase interpolator 206.

Figure 7:
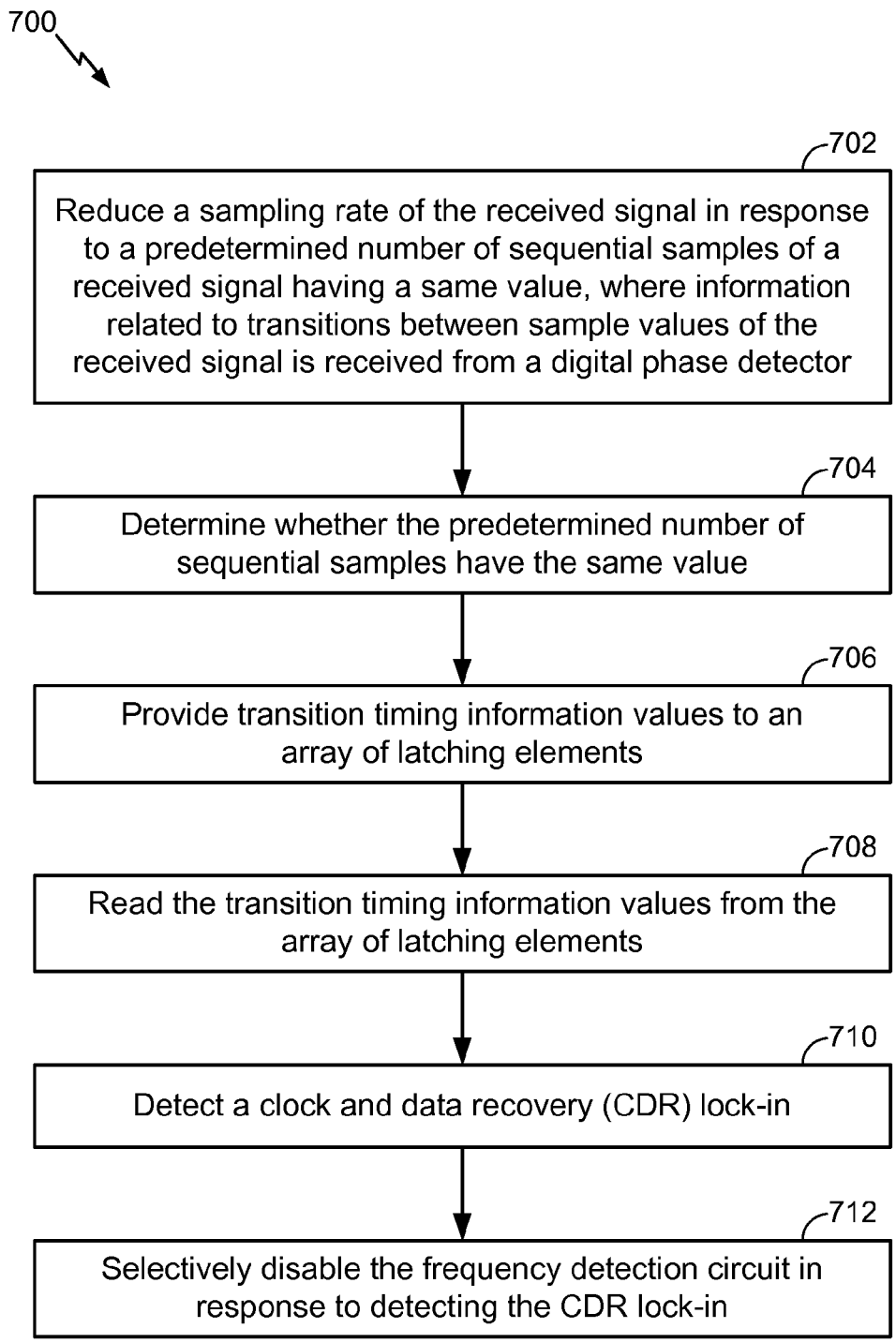
FIG. 7 is a flow chart of a particular illustrative embodiment of a method of recovering a clock and data from an input signal.

Referring to FIG. 7, a particular illustrative embodiment of a method 700 of recovering a clock and data from an input signal is illustrated. The method 700 may include reducing a sampling rate of a received signal in response to a predetermined number of sequential samples of the received signal having a same value, where information related to transitions between sample values of the received signal is received from a digital phase detector, at 702. For example, the sampler 204 of FIG. 2 samples the input signal 122 at a sampling rate determined by the multiphase clock provided by the phase interpolator 206 and provides the sequential samples to a digital phase detector, such as the bang-bang phase detector 208. The bang-bang phase detector 208 provides sample transition timing information to the frequency detection circuit 210. The encoding scheme used by the input signal 122 may have a maximum allowable number of sequential unit intervals that may have the same value. Therefore, the frequency detection circuit 210 may be configured to determine whether a predetermined number of sequential samples have the same value by monitoring the number of transitions that occur in the sequential samples. For example, the maximum allowable number of sequential unit intervals that have the same value may be five unit intervals and the corresponding number of predetermined sequential samples that have the same value may be six sequential samples. If there are no transitions between a predetermined number of sequential samples, the frequency detector 210 indicates to the digital loop filter 214 that the sample rate needs to be reduced. The digital loop filter 214 generates a control signal that causes the phase interpolator 206 to reduce the frequency of the multiphase clock provided to the sampler 204 to reduce the sampling rate applied to the received signal.

The method 700 may further include determining whether the predetermined number of sequential samples have the same value, at 704. For example, the number of transitions between the sequential samples may be monitored by the frequency detection circuit 210 of FIG. 2 to determine how many sequential samples have the same value and whether the predetermined number of sequential samples having the same value has been reached. Two sequential samples have the same value when there is no transition between the two sequential samples. Therefore, frequency detection circuit 210 may identify a predetermined number of sequential samples having the same value when there are no transitions between the predetermined number of sequential samples. As another example, the waveform diagram 600 of FIG. 6 illustrates a scenario in which the sampling rate is too fast as determined by the number of transition values a0-c2 indicating no transition between sequential sample values A0-D2.

The method 700 may further include providing transition timing information values to an array of latching elements, at 706. For example, the flip-flop array 410 of FIG. 4 may be configured to receive transition timing information, including transition values X0-X3, from the XOR gate 480. The XOR gates 480 may be part of the bang-bang phase detector 208 of FIG. 2 or they may be part of the frequency detection circuit 304 of FIG. 3.

The method 700 may further include reading the transition timing information values from the array of latching elements, at 708. For example, the retained transition timing information values, such as the retained transition values a0-d2 of FIG. 4, may be read from the flip-flop array 410 by the frequency detection circuit 210 and provided to the condition detecting logic 482.

The method 700 may further include detecting a clock and data recovery (CDR) lock-in, at 710, and may selectively disable the frequency detection circuit in response to detecting the CDR lock-in, at 712. For example, the CDR align detector 224 of FIGS. 2-3 may be configured to detect a clock and data recovery lock-in. When the CDR lock-in is achieved, the CDR align detector 224 may be configured to power down or otherwise disable the frequency detection circuit 210 or the frequency detection circuit 304.

Figure 8:
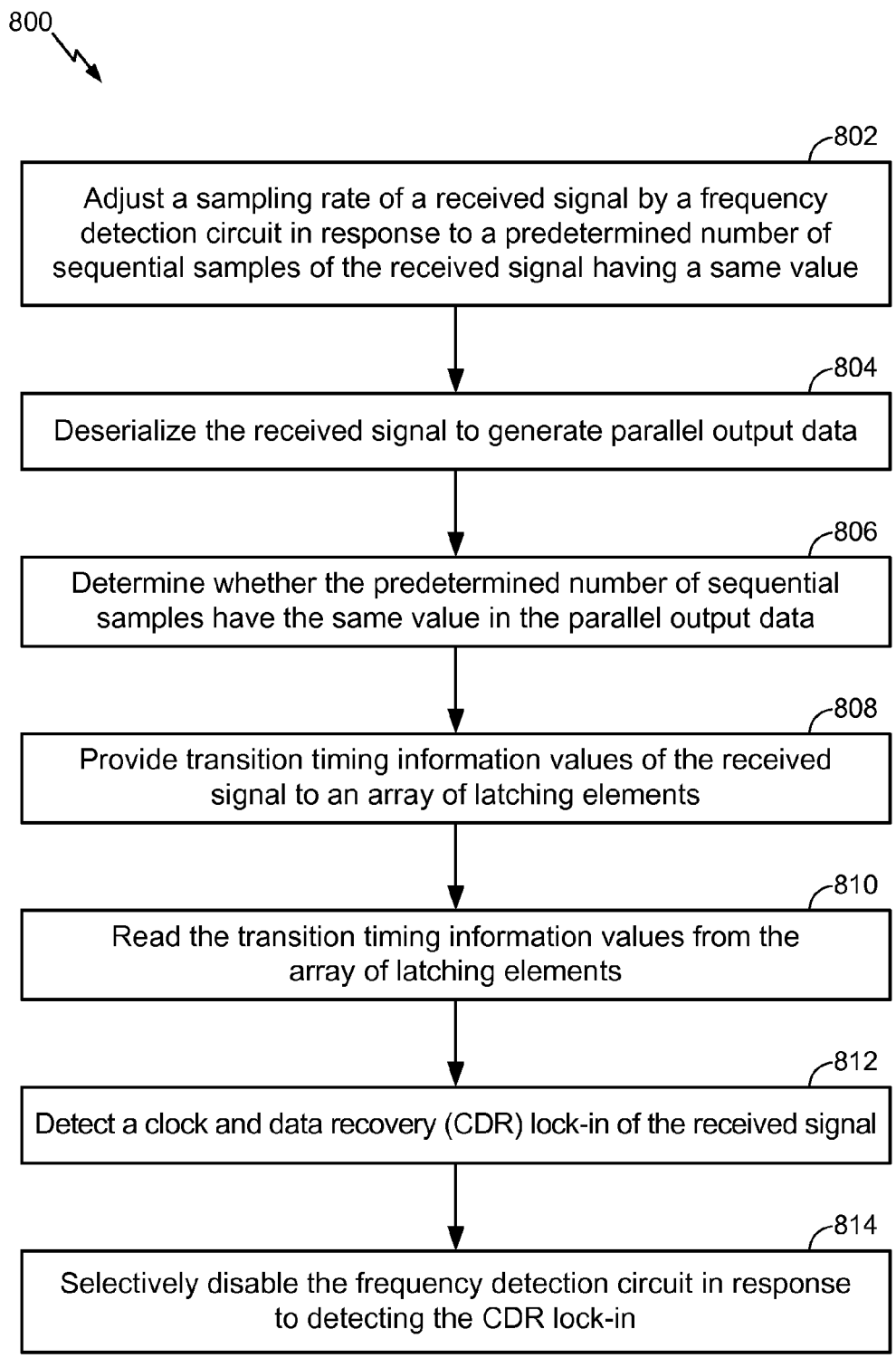
FIG. 8 is a flow chart of a second particular illustrative embodiment of a method of recovering a clock and data from an input signal.

Referring to FIG. 8, a particular illustrative embodiment of a method 800 of recovering a clock and data from an input signal is illustrated. The method 800 may include adjusting a sampling rate of a received signal by a frequency detection circuit in response to a predetermined number of sequential samples of the received signal having a same value, at 802. For example, the sampler 204 of FIG. 3 samples the differential input signal 342 at a sampling rate determined by the multiphase clock provided by the phase interpolator 206 and provides the sequential samples to a digital phase detector, such as the bang-bang phase detector 208, and to a de-serializer 302. The de-serializer 302 provides sequential samples in parallel to the frequency detection circuit 304. The frequency detection circuit 304 generates and stores sample transition timing information corresponding to the sequential samples. The encoding scheme used by the differential input signal 342 may have a maximum allowable number of sequential unit intervals that may have the same value. Therefore, the frequency detection circuit 210 may be configured to determine whether a predetermined number of sequential samples have the same value by monitoring the number of transitions that occur in the sequential samples. If there are no transitions between a predetermined number of sequential samples, the frequency detector 304 indicates to the digital loop filter 308 that the sample rate is to be reduced. The digital loop filter 308 generates a control signal that causes the phase interpolator 206 to reduce the frequency of the multiphase clock provided to the sampler 204 to reduce the sampling rate applied to the received signal.

Alternatively, if there are two sequential transitions in the sequential samples, the frequency detector 304 indicates to the digital loop filter 308 that the sample rate is to be increased. The digital loop filter 308 generates a control signal that causes the phase interpolator 206 to increase the frequency of the multiphase clock provided to the sampler 204 to increase the sampling rate applied to the received signal.

The method 800 may further include deserializing the received signal to generate parallel output data, at 804. The sampler 204 of FIG. 3 provides the sequential samples to a de-serializer 302. The de-serializer 302 receives the sequential samples and provides a specified number of samples in parallel to the frequency detection circuit 304. For example, the de-serializer 302 may be configured to provide five samples in parallel to the frequency detection circuit 304.

The method 800 may further include determining whether the predetermined number of sequential samples have the same value in the parallel output data, at 806. For example, the number of transitions between the sequential samples may be monitored by the frequency detection circuit 304 of FIG. 3 to determine how many sequential samples have the same value and whether the predetermined number of sequential samples having the same value has been reached. Two sequential samples have the same value when there is no transition between the two sequential samples. Therefore, the frequency detection circuit 304 may identify a predetermined number of sequential samples having the same value when there are no transitions between the predetermined number of sequential samples.

The method 800 may further include providing transition timing information values of the received signal to an array of latching elements, at 808. For example, the flip-flop array 410 of FIG. 4 may be configured to receive transition timing information, including transition values X0-X3, from the XOR gates 480. The XOR gates 480 may be part of the frequency detection circuit 304 of FIG. 3.

The method 800 may further include reading the transition timing information values from the array of latching elements, at 810. For example, the retained transition timing information values, such as the retained transition values a0-d2 of FIG. 4, may be read from the flip-flop array 410 by the frequency detection circuit 304 and provided to the condition detecting logic 482.

The method 800 may further include detecting a clock and data recovery (CDR) lock-in of the received signal, at 812, and may selectively disable the frequency detection circuit in response to detecting the CDR lock-in, at 814. For example, the CDR align detector 224 of FIG. 3 may be configured to detect a clock and data recovery lock-in. When the CDR lock-in is achieved, the CDR align detector 224 may be configured to power down or otherwise disable the frequency detection circuit 304.

Figure 9:
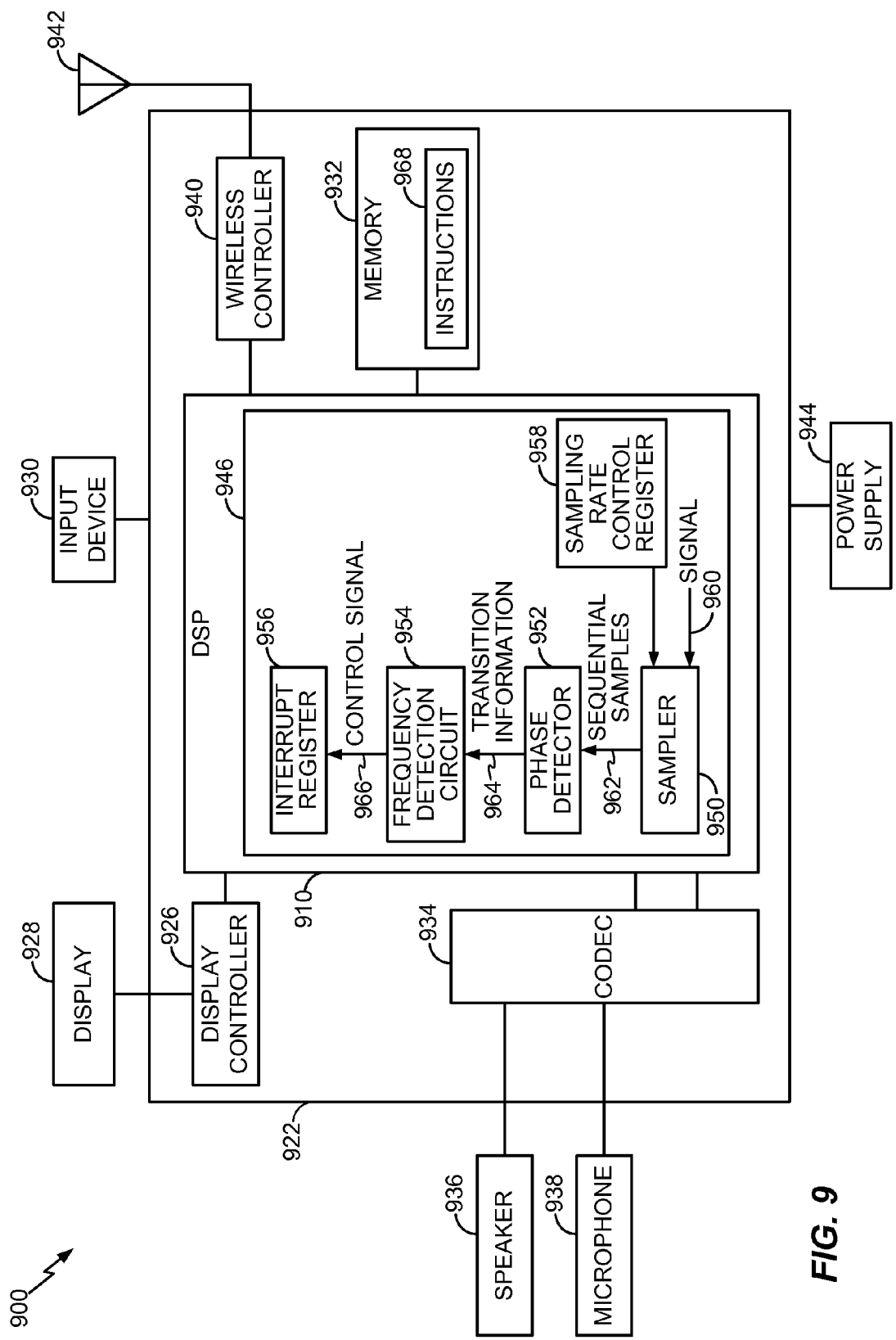
FIG. 9 is a block diagram of a wireless device including a digital circuit for recovering a clock and data from an input signal.

Referring to FIG. 9, a block diagram of a particular illustrative embodiment of an electronic device including a digital circuit to recover a clock and data from an input signal is depicted and generally designated 900. The device 900 includes a processor, such as a digital signal processor (DSP) 910, coupled to a memory 932. The DSP 910 may include a digital circuit 946 to recover a clock and data from an input signal. The digital circuit 946 includes a sampler 950, a phase detector 952, and frequency detection circuit 954, an interrupt register 956, and a sampling rate control register 958. The sampler 950 may be configured to sample an input signal received via a data path 960 in accordance with a sampling rate controlled by a sampling rate control register 958 and to provide the resulting sequential samples to the phase detector 952 via a data path 962. The phase detector 952 may be configured to provide transition information corresponding to transitions between sequential samples and to provide the transition information to the frequency detection circuit 954 via a data path 964. The frequency detection circuit 954 may be configured to determine whether the sampling rate of the sampler 950 is to be increased or decreased and to provide a control signal to an interrupt register 956 via a data path 966, where the control signal indicates whether the sampling rate of the sampler 950 is to be increased or decreased. The interrupt control register 956 may be configured to process the control signal and communicates to the sampling rate control register 958 that the sample rate is to be adjusted. The sampling rate control register 958 adjusts the sampling rate at the sampler 950 accordingly. In an illustrative example, the digital circuit 946 may be one of the digital circuits of FIGS. 1-3, may implement the method of FIG. 7 or 8, or any combination thereof.

FIG. 9 also shows a display controller 926 that is coupled to the digital signal processor 910 and to a display 928. A coder/decoder (CODEC) 934 can also be coupled to the digital signal processor 910. A speaker 936 and a microphone 938 can be coupled to the CODEC 934.

FIG. 9 also indicates that a wireless controller 940 can be coupled to the digital signal processor 910 and to a wireless antenna 942. In a particular embodiment, the DSP 910, the display controller 926, the memory 932, the CODEC 934, and the wireless controller 940, are included in a system-in-package or system-on-chip device 922. In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the wireless antenna 942, and the power supply 944 are external to the system-on-chip device 922. However, each of the display 928, the input device 930, the speaker 936, the microphone 938, the wireless antenna 942, and the power supply 944 can be coupled to a component of the system-on-chip device 922, such as an interface or a controller. Although the digital circuit 946 is shown in the DSP 910, in other embodiments, the digital circuit 946 may be external to the DSP 910 or external to the system-on-chip device 922.

The device 900 may include a non-transient computer readable tangible medium, such as the memory 932, for storing instructions 968 executable by a processor of a computer, such as the DSP 910. The instructions 968 may be executed by a computer (e.g., the DSP 910 or another processor) to reduce a sampling rate at the sampler 950 of a received signal in response to a predetermined number of sequential samples of the received signal having a same value, where information related to transitions between sample values of the received signal is received at a frequency detection circuit 954 from the phase detector 952. The instructions 968 may be executable by the computer to detect a clock and data recovery (CDR) lock-in of the received signal and to selectively disable the frequency detection circuit in response to detecting the CDR lock-in.

Figure 10:
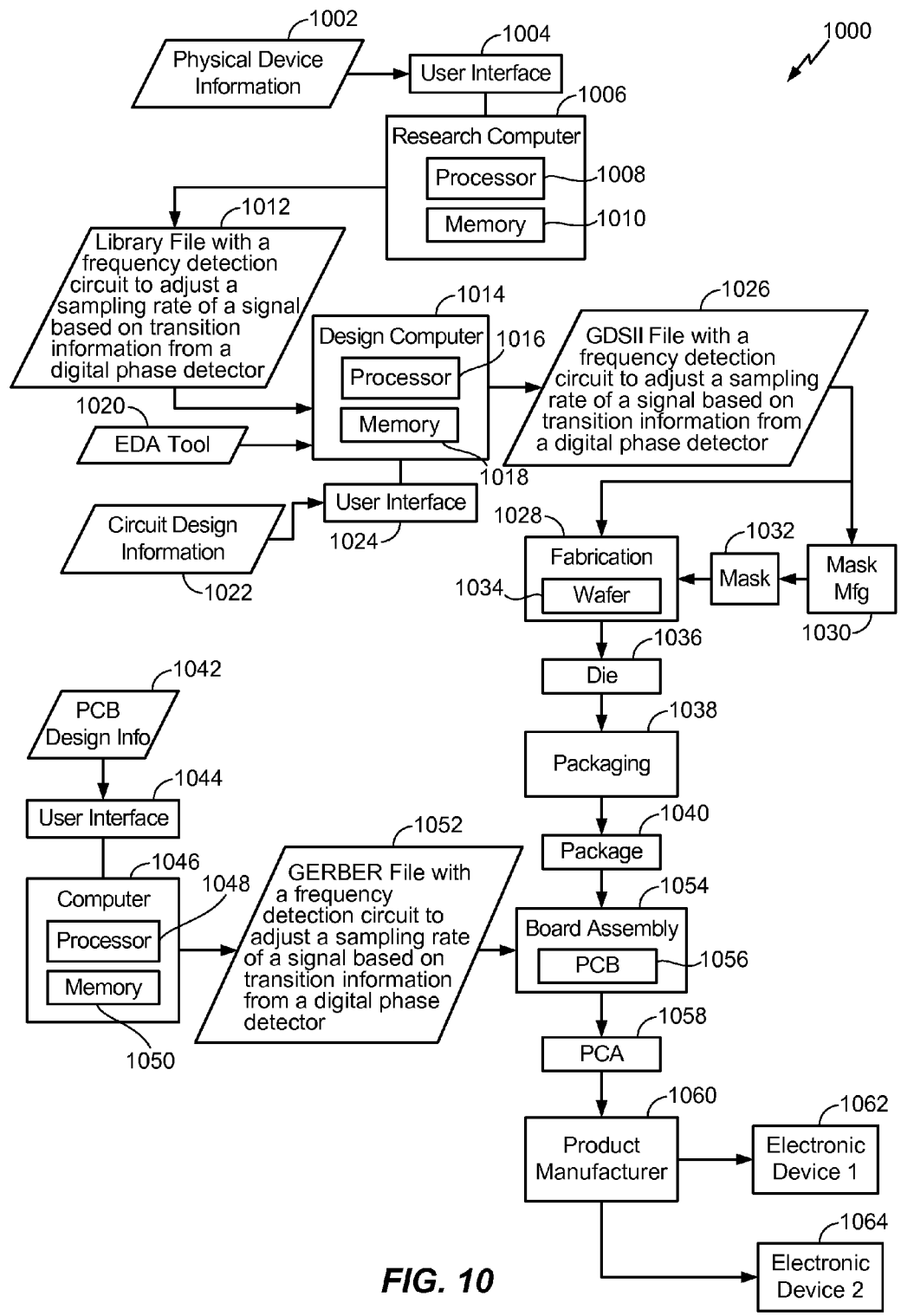
FIG. 10 is a data flow diagram illustrating a manufacturing process to manufacture a semiconductor device that includes a digital circuit for recovering a clock and data from an input signal.

FIG. 10 is a data flow diagram of a particular illustrative embodiment of a manufacturing process to manufacture electronic devices that include a method and a digital circuit to for recovering a clock and data from an input signal.

The foregoing disclosed devices and functionalities may be designed and configured into computer files (e.g. RTL, GDSII, GERBER, etc.) stored on computer readable media. Some or all such files may be provided to fabrication handlers that fabricate devices based on such files. Resulting products include semiconductor wafers that are then cut into semiconductor die and packaged into a semiconductor chip. The chips are then employed in devices described above. FIG. 10 depicts a particular illustrative embodiment of an electronic device manufacturing process 1000.

Physical device information 1002 is received in the manufacturing process 1000, such as at a research computer 1006. The physical device information 1002 may include design information representing at least one physical property of a semiconductor device, such as the digital circuit 100 of FIG. 1, the digital circuit 200 of FIG. 2, the digital circuit 300 of FIG. 3, or any combination thereof. To illustrate, the physical device information 1002 may include information corresponding to the digital circuit 300 of FIG. 3 to recover a clock and data from an input signal. For example, the physical device information 1002 may include physical parameters, material characteristics, and structure information that is entered via a user interface 1004 coupled to the research computer 1006. The research computer 1006 includes a processor 1008, such as one or more processing cores, coupled to a computer readable medium such as a memory 1010. The memory 1010 may store computer readable instructions that are executable to cause the processor 1008 to transform the physical device information 1002 to comply with a file format and to generate a library file 1012.

In a particular embodiment, the library file 1012 includes at least one data file including transformed design information. For example, the library file 1012 may include a library of semiconductor devices including the digital circuit 100 of FIG. 1, the digital circuit 200 of FIG. 2, the digital circuit 300 of FIG. 3, or any combination thereof, that is provided for use with an electronic design automation (EDA) tool 1020. To illustrate, the library file 1012 may include information corresponding to the digital circuit 300 of FIG. 3 to recover a clock and data from an input signal.

The library file 1012 may be used in conjunction with the EDA tool 1020 at a design computer 1014 including a processor 1016, such as one or more processing cores, coupled to a memory 1018. The EDA tool 1020 may be stored as processor executable instructions at the memory 1018 to enable a user of the design computer 1014 to design a circuit of the library file 1012, such as the digital circuit 100 of FIG. 1, the digital circuit 200 of FIG. 2, the digital circuit 300 of FIG. 3, or any combination thereof. For example, a user of the design computer 1014 may enter circuit design information 1022 via a user interface 1024 coupled to the design computer 1014. The circuit design information 1022 may include design information representing at least one physical property of a semiconductor device, such as the digital circuit 100 of FIG. 1, the digital circuit 200 of FIG. 2, the digital circuit 300 of FIG. 3, or any combination thereof. To illustrate, the circuit design information may include identification of particular circuits and relationships to other elements in a circuit design, positioning information, feature size information, interconnection information, or other information representing a physical property of a semiconductor device.

The design computer 1014 may be configured to transform the design information, including the circuit design information 1022 to comply with a file format. To illustrate, file formation may include a database binary file format representing planar geometric shapes, text labels, and other information about a circuit layout in a hierarchical format, such as a Graphic Data System (GDSII) file format. The design computer 1014 may be configured to generate a data file including the transformed design information, such as a GDSII file 1026 that includes information describing the digital circuit 100 of FIG. 1, the digital circuit 200 of FIG. 2, the digital circuit 300 of FIG. 3, or any combination thereof, in addition to other circuits or information. To illustrate, the GDSII file 1026 may include information corresponding to the digital circuit 300 of FIG. 3 to recover a clock and data from an input signal. To illustrate, the data file may include information corresponding to a system-on-chip (SOC) that includes the digital circuit 300 to recover a clock and data from an input signal, as in FIG. 3, and that also includes additional electronic circuits and components within the SOC.

The GDSII file 1026 may be received at a fabrication process 1028 to manufacture the digital circuit 100 of FIG. 1, the digital circuit 200 of FIG. 2, the digital circuit 300 of FIG. 3, or any combination thereof, according to transformed information in the GDSII file 1026. For example, a device manufacture process may include providing the GDSII file 1026 to a mask manufacturer 1030 to create one or more masks, such as masks to be used for photolithography processing, illustrated as a representative mask 1032. The mask 1032 may be used during the fabrication process to generate one or more wafers 1034, which may be tested and separated into dies, such as a representative die 1036. The die 1036 includes a circuit including the digital circuit 100 of FIG. 1, the digital circuit 200 of FIG. 2, the digital circuit 300 of FIG. 3, or any combination thereof. To illustrate, the representative die 1036 may include information corresponding to a digital circuit 300 to recover a clock and data from an input signal, as in FIG. 3.

The die 1036 may be provided to a packaging process 1038 where the die 1036 is incorporated into a representative package 1040. For example, the package 1040 may include the single die 1036 or multiple dies, such as a system-in-package (SiP) arrangement. The package 1040 may be configured to conform to one or more standards or specifications, such as Joint Electron Device Engineering Council (JEDEC) standards.

Information regarding the package 1040 may be distributed to various product designers, such as via a component library stored at a computer 1046. The computer 1046 may include a processor 1048, such as one or more processing cores, coupled to a memory 1050. A printed circuit board (PCB) tool may be stored as processor executable instructions at the memory 1050 to process PCB design information 1042 received from a user of the computer 1046 via a user interface 1044. The PCB design information 1042 may include physical positioning information of a packaged semiconductor device on a circuit board, the packaged semiconductor device corresponding to the package 1040 including the digital circuit 100 of FIG. 1, the digital circuit 200 of FIG. 2, the digital circuit 300 of FIG. 3, or any combination thereof.

The computer 1046 may be configured to transform the PCB design information 1042 to generate a data file, such as a GERBER file 1052 with data that includes physical positioning information of a packaged semiconductor device on a circuit board, as well as layout of electrical connections such as traces and vias, where the packaged semiconductor device corresponds to the package 1040 including the digital circuit 100 of FIG. 1, the digital circuit 200 of FIG. 2, the digital circuit 300 of FIG. 3, or any combination thereof. In other embodiments, the data file generated by the transformed PCB design information may have a format other than a GERBER format.

The GERBER file 1052 may be received at a board assembly process 1054 and used to create PCBs, such as a representative PCB 1056, manufactured in accordance with the design information stored within the GERBER file 1052. For example, the GERBER file 1052 may be uploaded to one or more machines for performing various steps of a PCB production process. The PCB 1056 may be populated with electronic components including the package 1040 to form a represented printed circuit assembly (PCA) 1058.

The PCA 1058 may be received at a product manufacture process 1060 and integrated into one or more electronic devices, such as a first representative electronic device 1062 and a second representative electronic device 1064. As an illustrative, non-limiting example, the first representative electronic device 1062, the second representative electronic device 1064, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 1062 and 1064 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-3 and FIG. 9 may illustrate remote units according to the teachings of the disclosure, the disclosure is not limited to these exemplary illustrated units. Embodiments of the disclosure may be suitably employed in any device that includes active integrated circuitry.

Thus, the digital circuit 100 of FIG. 1, the digital circuit 200 of FIG. 2, the digital circuit 300 of FIG. 3, or any combination thereof, may be fabricated, processed, and incorporated into an electronic device, as described in the illustrative process 1000. One or more aspects of the embodiments disclosed with respect to FIGS. 1-3 may be included at various processing stages, such as within the library file 1012, the GDSII file 1026, and the GERBER file 1052, as well as stored at the memory 1010 of the research computer 1006, the memory 1018 of the design computer 1014, the memory 1050 of the computer 1046, the memory of one or more other computers or processors (not shown) used at the various stages, such as at the board assembly process 1054, and also incorporated into one or more other physical embodiments such as the mask 1032, the die 1036, the package 1040, the PCA 1058, other products such as prototype circuits or devices (not shown), or any combination thereof. Although various representative stages of production from a physical device design to a final product are depicted, in other embodiments fewer stages may be used or additional stages may be included. Similarly, the process 1000 may be performed by a single entity, or by one or more entities performing various stages of the process 1000.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
   in response to a first predetermined number of consecutive signal samples of a received signal having a same bit value, reducing a sampling rate frequency of the received signal; and
   in response to a second predetermined number of consecutive signal samples of the received signal having alternating bit values, increasing the sampling rate frequency of the received signal, wherein information related to transitions between sample values of the received signal is received from a digital phase detector.

2. The method of claim 1, wherein the first predetermined number is determined by a reference to a maximum non-transition time associated with an encoding standard.

3. The method of claim 2, wherein the first predetermined number of consecutive signal samples is twelve consecutive signal samples, and wherein the second predetermined number of consecutive signal samples is three.

4. The method of claim 1, further comprising determining whether each of the first predetermined number of consecutive signal samples has the same bit value.

5. The method of claim 1, wherein the digital phase detector is a bang-bang phase detector (BBPD).

6. The method of claim 1, wherein the information related to transitions between sample values comprises transition timing information values, the method further comprising:
providing the transition timing information values to an array of latching elements; and
reading the transition timing information values from the array of latching elements.

7. The method of claim 1, wherein the sampling rate frequency is adjusted by a frequency detection circuit, and further comprising:
detecting a clock and data recovery (CDR) lock-in; and
in response to detecting the CDR lock-in, selectively disabling the frequency detection circuit.

8. The method of claim 1, wherein reducing the sampling rate frequency of the received signal is performed at a processor integrated into an electronic device.

9. An apparatus comprising:
a frequency detection circuit operative to compare information related to transitions between consecutive signal samples of a received signal and to generate a first control signal to reduce a sampling rate frequency of the received signal in response to a first predetermined number of the consecutive signal samples having a same bit value, wherein the frequency detection circuit is further operative to generate a second control signal to increase the sampling frequency of the received signal in response to a second predetermined number of consecutive signal samples of the received signal having alternating bit values; and
a digital phase detector operative to provide the information related to the transitions between consecutive signal samples to the frequency detection circuit.

10. The apparatus of claim 9, further comprising a sampler, the sampler comprising a rate control input configured to receive the first control signal and the second control signal.

11. The apparatus of claim 9, wherein the information related to transitions between consecutive signal samples comprises transition timing information values, the apparatus further comprising storage accessible to the frequency detection circuit and configured to store the transition timing information values.

12. The apparatus of claim 11, wherein the storage includes an array of flip-flops, wherein the array of flip-flops includes a first set of flip-flops, a second set of flip-flops, and a third set of flip-flops, wherein the first set of flip-flops receives first values from a set of XOR circuits, wherein the set of XOR circuits receive the consecutive signal samples as inputs, wherein the second set of flip-flops receives second values from the first set of flip-flops, and wherein the third set of flip-flops receives third values from the second set of flip-flops.

13. The apparatus of claim 12, wherein the first set of flip-flops includes four flip-flops, wherein the second set of flip-flops includes four flip-flops, wherein the third set of flip-flops includes four flip-slops, wherein a first XOR circuit of the set of XOR circuits receives a first signal sample of the consecutive signal samples and a second signal sample of the consecutive signal samples as inputs, wherein a second XOR circuit of the set of XOR circuits receives the second signal sample of the consecutive signal samples and a third signal sample of the consecutive signal samples as inputs, wherein a third XOR circuit of the set of XOR circuits receives the third signal sample of the consecutive signal samples and a fourth signal sample of the consecutive signal samples as inputs, and wherein a fourth XOR circuit of the set of XOR circuits receives the fourth signal sample of the consecutive signal samples and a fifth signal sample of the consecutive signal samples as inputs.

14. The apparatus of claim 13, wherein a multiple input NOR circuit receives a first set of outputs of the first set of flip-flops, a second set of outputs of the second set of flip-flops, and a third set of outputs of the third set of flip-flops, and wherein the multiple input NOR circuit generates the first control signal.

15. The apparatus of claim 13, wherein a first AND circuit receives a first output of the first XOR circuit and a second output of the second XOR circuit, wherein a second AND circuit receives the second output of the second XOR circuit and a third output of the third XOR circuit, wherein a third AND circuit receives the third output of the third XOR circuit and a fourth output of the fourth XOR circuit, wherein an OR circuit receives a fifth output of the first AND circuit, a sixth output of the second AND circuit, and a seventh output of the third AND circuit, and wherein the OR circuit generates the second control signal.

16. The apparatus of claim 9, wherein the consecutive signal samples are signal samples of the received signal based on a multi-phase clock signal, wherein a first signal sample is taken based on a first clock signal of the multi-phase clock signal, wherein a second signal sample is taken based on a second clock signal of the multi-phase clock signal, wherein a third signal sample is taken based on a third clock signal of the multi-phase clock signal, wherein a fourth signal sample is taken based on a fourth clock signal of the multi-phase clock signal, wherein the second clock signal is the first clock signal phase shifted 90 degrees, wherein the third clock signal is the first clock signal phase shifted 180 degrees, and wherein the fourth clock signal is the first clock signal phase shifted 270 degrees.

17. The apparatus of claim 9, wherein the consecutive signal samples are encoded at an encoding rate exceeding three gigahertz.

18. The apparatus of claim 9 integrated in at least one semiconductor die.

19. The apparatus of claim 9, wherein the frequency detection circuit is integrated into a set top box, a music player, a video player, an entertainment unit, a navigation device, a communications device, a personal digital assistant (PDA), a fixed location data unit, or a computer.

20. A method comprising:
reducing a sampling rate frequency of a received signal by a frequency detection circuit in response to a first predetermined number of consecutive signal samples of the received signal having a same bit value;
increasing the sampling rate frequency of the received signal by the frequency detection circuit in response to a second predetermined number of consecutive signal samples of the received signal having alternating bit values;
detecting a clock and data recovery (CDR) lock-in of the received signal; and
selectively disabling the frequency detection circuit in response to detecting the CDR lock-in.

21. The method of claim 20, wherein the first predetermined number is determined by a reference to a maximum non-transition time of an encoded signal associated with an encoding standard.

22. The method of claim 21, wherein the encoding standard comprises eight bit/ten bit (8b/10b), and wherein the first predetermined number of consecutive signal samples is six consecutive signal samples.

23. The method of claim 20, further comprising:
deserializing the received signal to generate parallel output data; and
determining whether each of the first predetermined number of consecutive signal samples has the same bit value in the parallel output data.

24. The method of claim 20, further comprising:
providing transition timing information values of the received signal to an array of latching elements; and
reading the transition timing information values from the array of latching elements.

25. The method of claim 20, wherein adjusting the sampling rate frequency, detecting the clock and the data recovery (CDR) lock-in, and selectively disabling the frequency detection circuit are performed at a processor integrated into an electronic device.

26. An apparatus comprising:
a frequency detection circuit operative to compare consecutive signal samples of a received signal and to generate a first control signal to reduce a sampling rate frequency of the received signal in response to a first predetermined number of the consecutive signal samples having a same bit value, wherein the frequency detection circuit is further operative to generate a second control signal to increase the sampling frequency of the received signal in response to a second predetermined number of consecutive signal samples of the received signal having alternating bit values; and
a deserializer operative to provide the consecutive signal samples of the received signal as parallel data to the frequency detection circuit.

27. The apparatus of claim 26, wherein the frequency detection circuit further comprises multiple exclusive-or (XOR) circuits configured to determine a transition between the consecutive signal samples.

28. The apparatus of claim 27, wherein the frequency detection circuit further comprises storage configured to store sample transition information corresponding to the consecutive signal samples.

29. The apparatus of claim 28, wherein the storage includes an array of flip-flops.

30. The apparatus of claim 26 integrated in at least one semiconductor die.

31. The apparatus of claim 26, wherein the frequency detection circuit is integrated into a set top box, a music player, a video player, an entertainment unit, a navigation device, a communications device, a personal digital assistant (PDA), a fixed location data unit, or a computer.

32. An apparatus comprising:
means for comparing consecutive signal samples of a received signal;
means for generating a first control signal in response to a first predetermined number of the consecutive signal samples having a same bit value;
means for generating a second control signal in response to a second predetermined number of the consecutive signal samples having alternating bit values; and
means for providing information related to transitions between sample values to the means for comparing, wherein the first control signal indicates a sampling rate frequency of the received signal is too fast, and wherein the second control signal indicates the sampling rate frequency is too slow.

33. The apparatus of claim 32, further comprising means for sampling the received signal, the means for sampling having a rate control input configured to receive the control signal.

34. The apparatus of claim 32, wherein the information related to transitions between sample values comprises transition timing information values, the apparatus further comprising means for storing the transition timing information values, wherein transition timing information values stored by the means for storing are accessible to the means for comparing.

35. The apparatus of claim 32 integrated in at least one semiconductor die.

36. The apparatus of claim 32, wherein the means for providing information is integrated into a set top box, a music player, a video player, an entertainment unit, a navigation device, a communications device, a personal digital assistant (PDA), a fixed location data unit, or a computer.

37. A method comprising:
a step for determining whether a first predetermined number of consecutive signal samples of a received signal have a same bit value;
a step for reducing a sampling rate frequency of the received signal in response to the first predetermined number of consecutive signal samples having the same bit value, wherein information related to transitions between sample values of the received signal is received from a digital phase detector;
a step for determining whether a second predetermined number of consecutive signal samples of the received signal have alternating bit values; and
a step for increasing the sampling frequency of the received signal in response to the second predetermined number of consecutive signal samples of the received signal having alternating bit values.

38. The method of claim 37, wherein the digital phase detector is a bang-bang phase detector (BBPD).

39. The method of claim 38, wherein the information related to transitions between sample values comprises transition timing information values, the method further comprising:
a step for providing the transition timing information values to an array of latching elements; and
a step for reading the transition timing information values from the array of latching elements.

40. The method of claim 37, wherein the sampling rate frequency is adjusted by a frequency detection circuit, and further comprising:
a step for detecting a clock and data recovery (CDR) lock-in of the received signal; and
a step for selectively disabling the frequency detection circuit in response to detecting the CDR lock-in.

41. The method of claim 37, wherein the step for determining whether the first predetermined number of consecutive signal samples of the received have the same bit value and the step for reducing the sampling rate frequency are performed at a processor integrated into an electronic device.

42. A non-transient computer readable tangible medium storing instructions executable by a computer, the instructions comprising:
instructions executable by the computer to reduce a sampling rate frequency of a received signal in response to a first predetermined number of consecutive signal samples of the received signal having a same bit value; and
instructions executable by the computer to increase the sampling rate frequency of the received signal in response to a second predetermined number of consecutive signal samples of the received signal having alternating bit values, wherein information related to transitions between sample values of the received signal is received from a digital phase detector.

43. The non-transient computer readable tangible medium of claim 42, wherein the sampling rate frequency is adjusted by a frequency detection circuit, and further comprising:
   instructions executable by the computer to detect a clock and data recovery (CDR) lock-in of the received signal; and
   instructions executable by the computer to selectively disable the frequency detection circuit in response to detecting the CDR lock-in.

44. The non-transient computer readable tangible medium of claim 42, wherein the non-transient computer readable tangible medium is integrated in a set top box, a music player, a video player, an entertainment unit, a navigation device, a communications device, a personal digital assistant (PDA), or a fixed location data unit.

45. A method comprising:
   receiving a data file comprising design information corresponding to a semiconductor device; and
   fabricating the semiconductor device according to the design information, wherein the semiconductor device comprises:
      a frequency detection circuit operative to compare consecutive signal samples of a received signal, and to generate a control signal to reduce a sampling rate frequency of the received signal in response to a first predetermined number of the consecutive signal samples having a same bit value,
         wherein the frequency detection circuit is further operative to generate a second control signal to increase the sampling frequency of the received signal in response to a second predetermined number of consecutive signal samples of the received signal having alternating bit values; and
      a digital phase detector operative to provide information related to transitions between sample values to the frequency detection circuit.

46. The method of claim 45, wherein the data file has a GDSII format.

47. The method of claim 45, wherein the data file has a GERBER format.

* * * * *